(12) United States Patent
Balraj et al.

(10) Patent No.: US 9,544,121 B2
(45) Date of Patent: Jan. 10, 2017

(54) METHODS AND DEVICES FOR DETERMINING EFFECTIVE MUTUAL INFORMATION

(71) Applicant: Intel IP Corporation, Santa Clara, CA (US)

(72) Inventors: Rajarajan Balraj, Nuremberg (DE); Holger Neuhaus, Munich (DE); Axel Clausen, Munich (DE); Ismael Gutierrez, Dresden (DE); Andreas Bury, Dresden (DE)

(73) Assignee: Intel IP Corporation, Santa Clara, CA (US)

( * ) Notice: Subject to any disclaimer, the term of this patent is extended or adjusted under 35 U.S.C. 154(b) by 111 days.

(21) Appl. No.: 14/499,478

(22) Filed: Sep. 29, 2014

(65) Prior Publication Data
US 2015/0092583 A1    Apr. 2, 2015

(30) Foreign Application Priority Data

Sep. 30, 2013    (DE) .................. 10 2013 110 833

(51) Int. Cl.
*H04L 12/26* (2006.01)
*H04L 5/00* (2006.01)
(Continued)

(52) U.S. Cl.
CPC .......... *H04L 5/0057* (2013.01); *H04B 7/0417* (2013.01); *H04B 7/063* (2013.01);
(Continued)

(58) Field of Classification Search
CPC .. H04L 5/0057; H04L 5/0073; H04L 25/0246; H04L 5/0048; H04W 24/08; H04B 7/063; H04B 7/0632; H04B 7/0639; H04B 7/0854; H04B 7/0417
See application file for complete search history.

(56) References Cited

U.S. PATENT DOCUMENTS

| | | | |
|---|---|---|---|
| 2008/0025443 A1* | 1/2008 | Lee ...................... | H04B 7/0857 375/347 |
| 2009/0238289 A1* | 9/2009 | Sampath ............... | H04L 5/0044 375/260 |

(Continued)

OTHER PUBLICATIONS

Li, X, et al. "A Effective SINR to System Mapping Method for CQI Feedback in TD-LTE System." IEEE Computing, Control and Industrial Engineering (CCIE), vol. 2., pp. 208-211, Aug. 2011.
Office Action dated Mar. 7, 2014 for German application No. 10 2013 110 833.4.

*Primary Examiner* — Ayaz Sheikh
*Assistant Examiner* — Hai-Chang Hsiung
(74) *Attorney, Agent, or Firm* — Eschweiler & Associates, LLC

(57) ABSTRACT

A method includes receiving at a receiver circuit a composite signal including non-interfered data resource elements and interfered data resource elements from a plurality of radio cells, and determining a first mutual information metric based on the non-interfered data resource elements. The method further includes determining a second mutual information metric based on the interfered data resource elements, and determining effective mutual information based on a combination of the first mutual information metric and the second mutual information metric.

18 Claims, 11 Drawing Sheets

(51) Int. Cl.
  *H04W 24/08* (2009.01)
  *H04B 7/04* (2006.01)
  *H04B 7/06* (2006.01)
  *H04B 7/08* (2006.01)
  *H04L 1/00* (2006.01)
  *H04L 25/02* (2006.01)

(52) U.S. Cl.
  CPC ......... *H04B 7/0632* (2013.01); *H04B 7/0639* (2013.01); *H04B 7/0854* (2013.01); *H04L 1/0003* (2013.01); *H04L 1/0026* (2013.01); *H04L 5/0073* (2013.01); *H04W 24/08* (2013.01); *H04L 5/0048* (2013.01); *H04L 25/0246* (2013.01)

(56) References Cited

U.S. PATENT DOCUMENTS

| | | | |
|---|---|---|---|
| 2011/0261868 A1* | 10/2011 | Bachl | H04L 1/206 375/224 |
| 2012/0028584 A1 | 2/2012 | Zhang et al. | |
| 2012/0113844 A1 | 5/2012 | Krishnamurthy | |
| 2013/0028354 A1* | 1/2013 | Lindoff | H04B 7/0845 375/340 |
| 2013/0064111 A1* | 3/2013 | Linsky | H04W 52/243 370/252 |
| 2013/0078927 A1 | 3/2013 | Razaviyayn et al. | |
| 2013/0195023 A1* | 8/2013 | Vaisanen | H04L 1/20 370/329 |
| 2014/0294130 A1* | 10/2014 | Umeda | H04L 25/022 375/349 |

\* cited by examiner

METHODS AND DEVICES FOR DETERMINING EFFECTIVE MUTUAL INFORMATION

REFERENCE TO RELATED APPLICATION

This Application claims priority to German application number 10 2013 110 833.4 filed on Sep. 30, 2013.

TECHNICAL FIELD

The disclosure generally relates to methods for determining effective mutual information based on interfered and non-interfered resource elements of a composite receive signal. The disclosure further relates to devices for performing such methods. In particular, the disclosure relates to channel state information (CSI) estimation methods for advanced receivers in the presence of non-colliding aggressors and receivers applying such methods.

BACKGROUND

Wireless communication networks may include multiple base stations and multiple User Equipments (UEs). Signals transmitted between components of a wireless communication network may include different kinds of interferences. The UE may be subject to strong interference fluctuations due to enhanced inter cell interference coordination (eICIC). Interference measured on a subframe belonging to a particular set shall not be mixed with the interference measured on a subframe belonging to another set. Methods and devices employed in wireless communication networks constantly have to be improved. In particular, it may be desirable to measure channel quality information (CQI) depending on the interference situation in the wireless communication network.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the concept of the present disclosure. The following detailed description, therefore, is not to be taken in a limiting sense, and the concept of the present disclosure is defined by the appended claims.

One of the key enhancements in a mobile communication standard, such as LTE Rel-10 and beyond, may be seen as the adoption of enhanced inter cell interference coordination (eICIC). The main driver behind adoption of eICIC in LTE Rel-10 was to ensure reliable LTE operation in heterogeneous network deployments. Heterogeneous networks may utilize a mix of diverse base stations deployed in order to improve the spectral efficiency per unit area. Such a layered network deployment can consist of regular placement of macro base stations that typically transmit at high power level (~5-40 W), overlaid with several pico and femto cells that typically transmit at lower power levels (~100 mW-2 W). The lower power cells may be deployed to eliminate the coverage holes in the macro cells and to improve efficiency in hot spots and e.g. CSG (closed subscriber group) type of services.

One of the key challenges in design of heterogeneous networks may be seen as the difference between low and high power base stations which can result in unfair distribution of data rates and uneven user experience among the user terminals in the network. For example, a pico base station may be characterized by substantially lower transmit power as compared to a macro base station. Due to the large disparity between the transmit power levels among the two types of base stations, the coverage of a pico base station may be significantly more limited than that of a macro base station. The larger coverage of macro cells may attract more users towards high power macro eNodeB although there might not be enough resources to efficiently serve all user terminals. At the same time, the resources of smaller power base station may remain underutilized.

Figure 1:
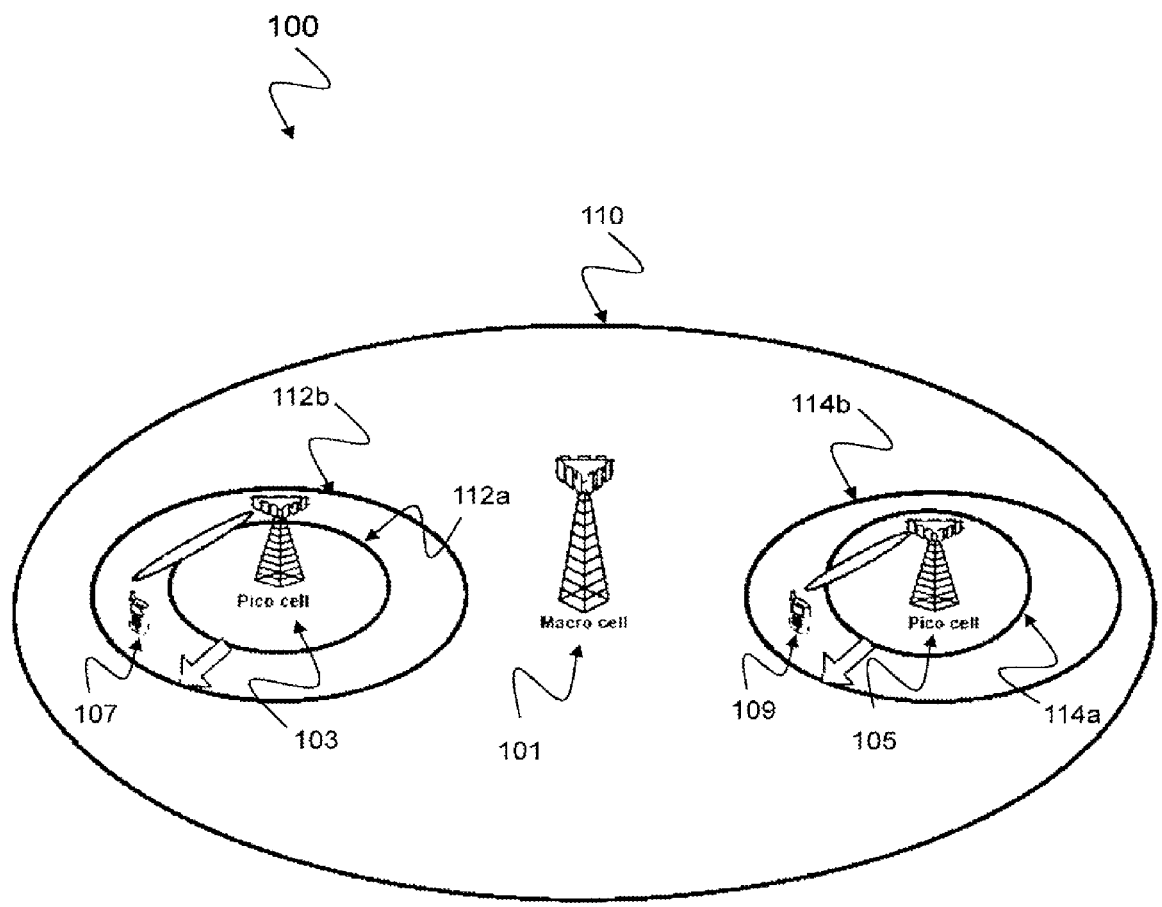
FIG. 1 is a schematic diagram of a heterogeneous network 100 illustrating cell range expansion of pico cells.

In order to enable pico-UEs to operate in such harsh interference, the concept of cell range expansion has been introduced. The cell range of a pico-cell may be expanded in order to allow more terminals to connect to pico eNodeB as shown in FIG. 1. It may be done by applying a handover bias for the pico cell 103, i.e. the UE 107 may connect to the pico cell 103 although the received signal from the macro cell 101 may be up to the handover bias larger than the signal received from the pico cell 103. With cell range expansion, traffic may be offloaded from the macro cell 101 and a more balanced load distribution across the various nodes is achieved. Macro cell transmission can be restricted from using the same time-frequency resources as the low-power node by resource partitioning (enhanced Inter Cell Interference Coordination, eICIC). Resource partitioning can be in either in frequency domain by using carrier aggregation or in time domain by using almost blank subframes (ABS).

The following terms, abbreviations and notations are used herein:
WMC: Weighted Metric Combining,
CSI: Channel State Information,
CQI: Channel Quality Information,
PMI: Precoding Matrix Indicator,
RI: Rank Identifier,
RSSI: Received Signal Strength Indicator,
eICIC: enhanced Inter-Cell Interference Coordination,
ABS: Almost Blank Sub-frames,
CRS: Cell specific Reference Signal,
RE: Resource Element,
RB: Resource Block,
MI: Mutual Information,
IRC: Interference Rejection Combining,
IM: Interference Mitigation,
IC: Interference Cancellation,
MMSE: Minimum Mean Square Error,
AP: Antenna Port,
SNR: Signal to Noise Ratio,
SINR: Signal to Interference and Noise Ratio,
MIB: Mutual Information per coded Bit,
MMIB: Mean Mutual Information per Bit,
EESM: Effective Exponential SINR metric,
HARQ: Hybrid Automatic Repeat Request,
LTE: Long Term Evolution,
LTE-A: LTE Advanced, Release 10 and higher versions of LTE,
RF: Radio Frequency,
UE: User Equipment,
RLM: Radio Link Monitoring,
PDSCH: Physical Downlink Shared Channel,
PDCCH: Physical Downlink Control Channel,
MBSFN: Multicast/Broadcast over Single Frequency Network,
INR: Interference to Noise Ratio,
MCS: Modulation Coding Scheme,
OFDM: Orthogonal Frequency Division Multiplex,
QPSK: Quadrature Phase Shift Keying,
QAM: Quadrature Amplitude Modulation,
RBSF: Resource Block Subframe, i.e., a resource block in frequency direction times subframe in time direction,
BER: Bit Error Rate,
BLER: Block Error Rate,
AWGN: Additive White Gaussian Noise,
EPA5: "Extended Pedestrian A model" multi-path fading propagation conditions according to 3GPP technical specification 36.104 V10.2.0 Annex B.2 (2011-05), using a Doppler frequency of 5 Hz,
EVA5: "Extended Vehicular A model" multi-path fading propagation conditions according to 3GPP technical Specification 36.104 V10.2.0 Annex B.2 (2011-05), using a Doppler frequency of 5 Hz.

The methods and devices described herein may be based on two-dimensional signal patterns, reference resource elements (REs) and covariance measures. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on an LTE and/or OFDM standard and in particular MIMO communication systems. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

In the following, Orthogonal Frequency-Division Multiplexing (OFDM) systems are described. OFDM is a scheme for encoding digital data on multiple carrier frequencies. OFDM is a Frequency-Division Multiplexing (FDM) scheme used as a digital multi-carrier modulation method. A large number of closely spaced orthogonal sub-carrier signals may be used to carry data. The orthogonality may prevent cross-talk between sub-carriers. The data may be divided into several parallel data streams or channels, one for each sub-carrier. Each sub-carrier may be modulated with a modulation scheme (such as quadrature amplitude modulation or phase-shift keying) at a low symbol rate, maintaining total data rates similar to single-carrier modulation schemes in the same bandwidth. OFDM may be essentially identical to coded OFDM (COFDM) and Discrete Multi-Tone modulation (DMT).

In the following, covariance measures, covariance matrices, signal covariance measures, noise and interference covariance measures and signal and interference covariance measures are described. The covariance measure may generalize the notion of variance to multiple dimensions. As an example, the variation in a collection of random points in two-dimensional space may not necessarily be characterized fully by a single number, nor would the variances in the x and y directions contain all of the necessary information. A $N_{Rx} \times N_{Rx}$ measure, where $N_{Rx}$ denotes the number of receive antennas, called the covariance measure may be necessary to fully characterize the two-dimensional variation. The covariance measure can be mathematically implemented as a covariance matrix, for example.

In probability theory and statistics, a covariance matrix (also known as dispersion matrix or variance covariance matrix) may be a matrix whose element in the position i, j is the covariance between the $i^{th}$ and $j^{th}$ elements of a random vector (that is, of a vector of random variables). Each element of the vector may be a scalar random variable, either with a finite number of observed empirical values or with a finite or infinite number of potential values specified by a theoretical joint probability distribution of all the random variables. If the entries in a column vector $X=(X_1, \ldots, X_n)^T$ are random variables, each with finite variance, then the covariance matrix S may be the matrix whose entry (i,j) is the covariance $cov(X_i, X_j)=E[(X_i-\mu_i)(X_j-\mu_j)]$, wherein $\mu_i=E(X_i)$ is the expected value of the i-th entry in the vector X.

In the following, multi-layer heterogeneous networks, macro cells, pico cells, femto cells, target cells, and interfering cells are described. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes. These eNodeBs may commonly be referred to as Macro eNodeBs (MeNB) or macro cells, Pico eNodeBs (PeNB) or pico cells and femto/Home eNodeBs (HeNB) or femto cells and meant for basic outdoor, outdoor hot-zone and indoor/enterprise coverage, respectively.

Macro cells may cover a large cell area (typical cell radius being of the order of 500 meters to a kilometer), with transmit antennas above the clutter and transmission power of the order of 46 dBm (20 watts). They may provide service to all users. Femto cells, also called Home eNodeBs (HeNBs) may be lower power cells installed (typically indoors) by an end-consumer. Pico cells may be operator deployed cells, with lower transmission powers—typically an order of magnitude smaller—relative to macro cell eNodeBs. They may be typically installed in wireless hotspot areas and may provide access to all users. In a scenario where a UE is connecting to pico cells, the pico cell may represent the target cell while the macro cell may represent the interfering cell providing strong interference.

In the following, Cell-specific Reference Signals (CRS) and interference measurements based on cell-specific reference signals are described. To facilitate the estimation of the channel characteristics, a mobile communication standard, such as LTE, may use cell specific reference signals also referred to as pilot symbols inserted in both time and frequency. These pilot symbols may provide an estimate of the channel at given locations within a subframe. Through interpolation it may be possible to estimate the channel across an arbitrary number of subframes. CRS may be transmitted in each physical antenna port. It may be used for both demodulation and measurement purpose. Its pattern design may ensure channel estimation accuracy. Cell-specific reference signals may be used for cell search and initial acquisition, downlink channel estimation for coherent demodulation/detection at the UE and downlink channel quality measurements. Interference measurements may be performed based on the cell-specific reference signals in the form of a noise and interference covariance matrix $\hat{R}_n$ according to:

$$\hat{R}_n = \sum_{i=0}^{N_{AP}} \frac{1}{N_{P,i}} (\tilde{h}_{AP,i} - \hat{h}_{AP,i})(\tilde{h}_{AP,i} - \hat{h}_{AP,i})^H, \quad (1)$$

where
$N_{P,i}$ is the number of pilots for antenna port i;
$\tilde{h}_{AP,i}$ is the demodulated pilot at antenna port i; and
$\hat{h}_{AP,i}$ is the channel estimate of the pilot at antenna port i.

In the following, eICIC and Almost Blank Sub-frames (ABS) are described. eICIC may avoid heavy inter-cell interference on both data and may control channels of the downlink. eICIC may be based on carrier aggregation with cross-carrier scheduling or based on Time-Domain Multiplexing (TDM) using so called ABS.

ICIC based on Carrier Aggregation may enable an LTE-A UE to connect to several carriers simultaneously. It not only may allow resource allocation across carriers, it also may allow scheduler based fast switching between carriers without time consuming handover. A simple principle in a HetNet scenario may be to partition the available spectrum into e.g. two separate component carriers and assign the primary component carriers (PCC) to different network layers. The primary component carrier may be the cell that provides the control information to the UEs. Each network layer can additionally schedule UEs on other CCs called Secondary Component Carriers (SCC).

ICIC based on Time Domain Multiplexing may periodically mute transmissions from eNodeBs inflicting severe interference onto others for entire sub-frames, so that the victim eNodeBs may have a chance to serve their UEs suffering from severe interference from the aggressor eNodeB in these sub-frames. This muting may be not necessarily complete, as certain signals such as common reference symbols (unless configured as MBSFN sub-frame), Primary and Secondary Synchronization Signals (PSS and SSS), Physical Broadcast Channel (PBCH), SIB-1 and paging with their associated PDCCH may have to be transmitted even in otherwise muted sub-frames e.g. to avoid radio link failure or for reasons of backwards compatibility. Collisions of sub-frame muting with PSS, SSS, SIB-1 and paging may be minimized. Hence, muting in sub-frames #0, #1, #5 and #9 may be avoided as far as possible. Sub-frames thus muted may be referred to as ABS.

In the following, whitening filters, IRC receivers and MIMO detectors are described. Noise (and other additive distortions) usually may have non-flat amplitude spectrum. A noise whitening filter may equalize the spectrum of the signal, thereby making it similar to the white noise spectrum. Noise whitening filters may enhance low level spectral components and may attenuate high level ones.

Interference Rejection Combining (IRC) is a technique that may be used in an antenna diversity system to suppress co-channel interference by using the cross covariance between the noise in diversity channels. Interference Rejection Combining (IRC) may be used as an efficient alternative to increase downlink bit rates in areas where cells may overlap. An IRC receiver may be effective in improving the cell-edge user throughput because it may suppress inter-cell interference. The IRC receiver may be typically based on a Minimum Mean Square Error (MMSE) criteria, which may require channel estimation and covariance matrix estimation including the inter-cell interference with high accuracy.

Multiple-Input Multiple-Output (MIMO) wireless communication systems may employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which may be described by the channel matrices between respective antennas of the transmitter and respective antennas of the receiver.

The methods and devices described herein may be based on constellation symbols, Logarithmic Likelihood Ratios (LLRs), Mutual Information (MI) and mutual information metrics as described in the following. Rather than bits x, communication systems may send symbols s that are selected from a given alphabet or constellation, according to a mapping that associates groups of K bits to points in the constellation: s=map($x_1, \ldots, x_K$). The presence of a channel may cause the received symbol r to be different from the transmitted symbol s. The distortion introduced by a wireless channel in the symbol can be modeled as a multiplication by a complex factor and the addition of noise, so that the received symbol r can be described by the relation r=as+n. Based on r and on the channel model that is assumed, the receiver can associate marginal posterior probabilities p($x_k$/r), $x_k \in \{0,1\}$ to each of the K original bits. The process of feeding probabilities into the decoding algorithm may be denoted as "soft decoding" while the process of feeding the most likely bit into the decoding algorithm may be denoted as "hard decoding". By using probabilities instead of hard bits as input, the performance of error decoding can be improved significantly. Logarithmic Likelihood Ratios (LLRs) may be compact representations of these marginal posterior probabilities, which can be computed for a transmitted bit $x_k$ as follows $$l_k = \log \frac{p(x_k = 1 \mid r)}{p(x_k = 0 \mid r)} \quad (I)$$

The concatenation of symbol mapping, transmission channel and LLRs compression can be described as an equivalent channel. According to Shannon's channel coding theorem, the channel capacity may represent an upper bound for the rate at which data can be sent, provided a good channel code is chosen, with arbitrarily low error probability. Therefore, it may make sense to maximize the capacity of that equivalent channel. The expression for the channel capacity for a single (marginalized) LLR, I may become $$\begin{aligned} C &= I(X_k; Y_k) \quad (II) \\ &= H(X_k) - H(X_k \mid Y_k) \\ &= 1 + \sum_{x_k \in \{0,1\}} \sum_{y_k} p(x_k \mid y_k) p(y_k) \log_2 p(x_k \mid y_k) \end{aligned}$$

where $x_k$ is the original bit and $y_k$=Q(I) represents the reconstruction value for its LLR, I(.;.) is the mutual information between random variables, H(.) is the entropy and H(./.) is the conditional entropy of a random variable given that another is observed. If equally likely input bits H($X_k$)=1 are assumed, the channel capacity may only depend on the conditional entropy of the original bit given that the reconstructed LLR, H($X_k$/$Y_k$) may be observed. The problem of maximizing channel capacity may be therefore equivalent to that of maximizing the mutual information I(X; Y) between original bits and compressed LLRs, which is why maximum mutual information (MMI) can be used as a suitable design criterion for optimizing transmission over the communication channel.

The mutual information can be used to estimate the amount of information that can be delivered by a modulation symbol at a given SNR in noise, e.g. AWGN. The function I(.) may describe the mutual information between the transmitted and received modulation symbols versus SNR and may be modulation specific, e.g. using the three modulations QPSK, 16 QAM and 64 QAM as specified by LTE. However, the main difference from QPSK to 16 QAM and from 16 to 64 QAM can be described by an SNR shift, for example in the range of about 5 dB.

Mutual information can be equivalently expressed as: I($X_k$; $Y_k$)=H($X_k$)−H($X_k$|$Y_k$)=H($X_k$)+H($Y_k$)−H($X_k$,$Y_k$), where H($X_k$) and H($Y_k$) are the marginal entropies, H($X_k$|$Y_k$) is the conditional entropy and H($X_k$,$Y_k$) is the joint entropy of $X_k$ and $Y_k$. The quantity d(X,Y)=H(X,Y)−I(X; Y)=H(X)+H(Y)−2I(X; Y) may satisfy the properties of a metric, i.e. triangle inequality, non-negativity, indiscernibility and symmetry and can be used as example for a mutual information metric. Other quantities, such as I(X; Y), 2I(X; Y), 4I(X; Y), 6I(X; Y), are further examples for mutual information metrics.

The methods and devices described herein may be based on Mean Mutual Information per coded Bit (MMIB) metric as one example for a mutual information metric. Mean mutual information per coded bit metric may be the mean mutual information between coded bits and their LLR values. The MMIB metric itself, once computed for QPSK, 16 QAM, and 64 QAM, for example, can be used to model the decoded performance for any MCS and coding rate, without the need of defining any MCS-dependent adjustment factors. MMIB metric may also be extended to model HARQ (both chase and IR) and MIMO ML or quasi-ML receiver. The MMIB metric may link the SINR of each subcarrier (or group of sub-carriers) to the mutual information between each encoded bit including the received QAM symbols and the corresponding log-likelihood ratio (LLR). This may yield a mean mutual information per bit (MMIB) measure that may be attributed to "quality" of the entire codeword if sent on that particular channel. This measure can then be used to predict the block error rate for a hypothesized MCS transmission, or space-time coding scheme, or spatial multiplexing scheme.

The methods and devices described herein may be based on effective signal-to-interference-plus-noise ratio metrics and mean mutual information per coded bit as described in the following. For communication systems like OFDM where multiple channel states may be obtained on a transmitted codeword, link performance prediction may be based on determining a function I($SINR_1$, $SINR_2$) which may map multiple physical SINR observations (or channel states for MIMO channels) into a single "effective SINR" metric $SINR_{eff}$. This $SINR_{eff}$ can then be input to a second mapping function B($SINR_{eff}$) to generate a block error rate (BLER) estimate for a hypothesized codeword transmission. A set of N SINR measures may be denoted as $SINR_n$, 0<=n<N, the SINR, where the SINR measures may correspond to SINR observations of individual data sub-carriers (and therefore of associated QAM symbols) transporting the hypothesized codeword of interest.

Then, an exemplary effective SINR metric may be defined as $$\Gamma \triangleq I\left(\frac{SINR_{eff}}{\alpha_1}\right) = \frac{1}{N} \sum_{n=1}^{N} I\left(\frac{SINR_n}{\alpha_2}\right) \quad (III)$$

where $\alpha_1$ and $\alpha_2$ are constants which may be constrained to be equal and which may be MCS-specific, and $\Gamma$ may correspond to a defined statistical measure. I(.) may be a reference function usually selected to represent a performance model such as Effective Exponential SINR metric (EESM) that may be derived by using an exponential function, which may be based on using Chernoff approximation to the union bounds on the code performance. Similarly other performance measures like capacity or mutual information can be used. Γ may be referred to as the Mean Mutual Information per coded Bit (MMIB), or simply denoted as M. The exemplary effective SINR metric of equation (III) may be simplified when $\alpha_1$ and $\alpha_2$ are discarded, i.e., set to unity. That is, M may become $$M = I(SINR_{eff}) = \frac{1}{N}\sum_{n=1}^{N} I_m(SINR_n) \quad\quad (IV)$$

$$\Rightarrow SINR_{eff} = I^{-1}(M) = I^{-1}\left(\frac{1}{N}\sum_{n=1}^{N} I_m(SINR_n)\right)$$

where I(.) may be a function that may depend on the modulation type identified by m and the associated bit labeling in the constellation, where m∈ {2, 4, 6} corresponding to QPSK, 16-QAM, 64-QAM respectively. $I_m(.)$ may map the sub-carrier SINR to the mean mutual information between the log-likelihood ratio and the binary codeword bits including the QAM symbol.

Due to the asymmetry of bit-to-symbol mapping in the constellation, each bit in the m-tuple labeling of each QAM symbol may perceive a different equivalent channel (commonly referred to as unequal error protection). For an m-tuple input word there may exist m mutual information functions $I_{m,i}$, where $$M = I_m(SINR) = \frac{1}{m}\sum_{i=1}^{m} I_{m,i}(SINR) \quad\quad (V)$$

$I_m$ may be approximated using numerical methods and then may be stored for later use. The above quantity may be referred to as Mutual Information per coded Bit or MIB, with the understanding that it may be derived by averaging over the "m" bit channels. Furthermore, Mean Mutual Information per Bit (MMIB) may be used to refer to the mean obtained over different channel states or SNR measures. $I_m$ can be accurately computed without the need of defining any adjustment factor and three $I_m$ functions (i.e., for m=2, 4, 6) may be specified that do not necessarily depend on the coding rate and may be adequate for predicting performance for any modulation and coding scheme. Table 1 illustrates exemplary numerical approximations for such three exemplary MMIBs.

| MI function | Numerical approximation |
| --- | --- |
| $I_2(\gamma)$ (QPSK) | $M = J(2\sqrt{\gamma})$ (Exact) |
| $I_4(\gamma)$ (16 QAM) | $M = \frac{1}{2}J(0.8\sqrt{\gamma}) + \frac{1}{4}J(2.17\sqrt{\gamma}) + \frac{1}{4}J(0.965\sqrt{\gamma})$ |
| $I_6(\gamma)$ (64 QAM) | $M = \frac{1}{3}J(1.47\sqrt{\gamma}) + \frac{1}{3}J(0.529\sqrt{\gamma}) + \frac{1}{3}J(0.366\sqrt{\gamma})$ |

Table 1: numerical approximations for three exemplary MMIBs

The three MMIBs may be expressed as mixtures of non-overlapping Gaussian distributions that may be defined by individual means $c_i$, standard deviations x and the associated marginal probability according to $$I(x) = \sum_{i=1}^{K} a_i J(c_i x) \quad\quad (VI)$$

$$\sum_i a_i = 1$$

The methods and devices described herein may be based on MIMO schemes, transmission diversity, spatial multiplexing, precoding matrices, link adaptation, feedback mechanism and channel quality indication as described in the following. In the so-called closed-loop spatial multiplexing transmission of Long Term Evolution (LTE) the feedback for channel adaption may include three values which may be the Channel Quality Indicator (CQI), the Rank Indicator (RI) and the Precoding Matrix Indicator (PMI). By the CQI the transmitter may select one of 15 modulation alphabet and code rate combinations for transmission. The RI may inform the transmitter about the number of useful spatial transmission layers for the current MIMO channel, which may be not more than four in the current standard, and the PMI may signal the codebook index of the preferred precoding matrix.

MIMO techniques may be integrated into the LTE physical layer. The MIMO schemes standardized for LTE may include transmit diversity schemes as well as spatial multiplexing modes. Within the MIMO spatial multiplexing modes of LTE DL, a maximum of four spatial layers may be used but only two independent codewords may be transmitted. A codeword may be a block of encoded bits that may be transmitted in one Transmission Time Interval (TTI). The eNB (eNodeB) can use feedback from the UE in order to select a MIMO precoding matrix within a predefined set ("closed-loop" MIMO), or to rely on "open-loop" MIMO, where a fixed precoding matrix may be applied. The precoding matrix can be seen as a set of adaptive complex weights applied at the eNB antenna ports aimed to improve the MIMO post-processing signal to noise ratio in the UE.

Even with open-loop MIMO, or with a transmission diversity scheme, feedback from the UE may be needed to perform Link Adaptation (LA). LA may be the process by which the eNB, assisted by the UE, may select the modulation and coding scheme (MCS) that will be used for DL transmission in the next TTI. LA may aim to adapt the information data rate for each UE to its current channel capacity. In LTE the MCS may be constant over all the allocated frequency resources of a particular user, but if two codewords may be transmitted simultaneously using MIMO spatial multiplexing, then each codeword can use an independent MCS. The UE may measure the DL received signal quality using the reference signals ("pilots") and may report to the eNB the preferred MCS for each codeword. This report may be signaled using a Channel Quality Indicator (CQI) index, and may summarize the measured signal quality and also the UE capabilities since the UE is signaling a MCS such that, given current channel conditions, the next codeword may be received with a Block Error Rate (BLER) below 10%. Therefore, a suitable set of BLER versus channel quality thresholds should be made available to the UE in order to produce meaningful CQI feedbacks. Link abstraction models, e.g. representations using mutual information metrics as described above to describe the channel capacity, can be used to obtain the set of valid Look Up Tables (LUT) from which CQIs can be reported.

A feedback strategy for the PMI and RI values may involve the following exemplary items: Calculating the mutual information for all possible precoders and spatial layer numbers for all resource blocks; and finding the combination of layer number and precoders that maximizes the sum mutual information over all resource blocks. The RI may be given by this layer number and the PMIs by the codebook indices of the precoders.

A feedback strategy for CQI may be based on averaging the post-equalization SINR over all resources R of interest. This can include SINRs corresponding to single or multiple RBs per layer but also to RBs of different layers. A SINR mapping may map several SINR values to an equivalent SNR value of a SISO AWGN channel, for example. This equivalent AWGN channel may have similar BLER performance as the original OFDM system. An exemplary mapping may be given by $$SNR_{\mathit{eff}} = \beta f^{-1}\left(\frac{1}{R}\sum_{r=1}^{R} f\left(\frac{SINR_r}{\beta}\right)\right),\qquad\text{(VII)}$$

where R corresponds to the number of resources of interest, the function $f$ may correspond to an exponential or may be given by a coded modulation capacity. The CQI dependent β value may be used to adjust the mapping to the different code rates and modulation alphabets. The mapping from $SNR_{\mathit{eff}}$ to a corresponding CQI value may be carried out such that a BLER lower than 0.1 may be achieved. An exemplary CQI feedback value may be defined as the highest possible value which may deliver the highest throughput with BLER<=0.1 for the equivalent SISO AWGN channel.

FIG. 1 is a schematic diagram of a heterogeneous network 100 that may include a macro cell and pico cells for illustrating cell range expansion of pico cells. The pico base stations 103, 105 may be characterized by substantially lower transmit power as compared to the macro base station 101. Due to the large disparity between the transmit power levels among two type of base stations, the coverage 112a, 114a of the pico base station 103, 105 may be significantly limited than the coverage 110 of the macro base station 101 as shown in FIG. 1. The larger coverage 110 of the macro cells 101 may attract more users 107, 109 towards high power macro eNodeB although there might not be enough resources to efficiently serve all user terminals. At the same time, the resources of smaller power base station may remain underutilized. In order to enable pico UEs to operate in harsh interference scenarios, the concept of cell range expansion may be introduced. The cell range 112a, 114a of the pico cell 103, 105 may be expanded to an expanded range 112b, 114b in order to allow more terminals to connect to the pico eNodeB 103, 105 as shown in FIG. 1. With cell range expansion, traffic may be offloaded from the macro cell and a more balanced load distribution across the various nodes may be achieved. The methods and devices as described below with respect to FIGS. 4, 5 and 6 may be applied in such heterogeneous network 100. The user equipments 107, 109 may implement these methods 400 for flexibly connecting to either the macro cell 101 or the pico cell 103, 105. The devices 500, 600 described below with respect to FIGS. 5 and 6 may be implemented in such user equipment 107, 109.

Figure 2:
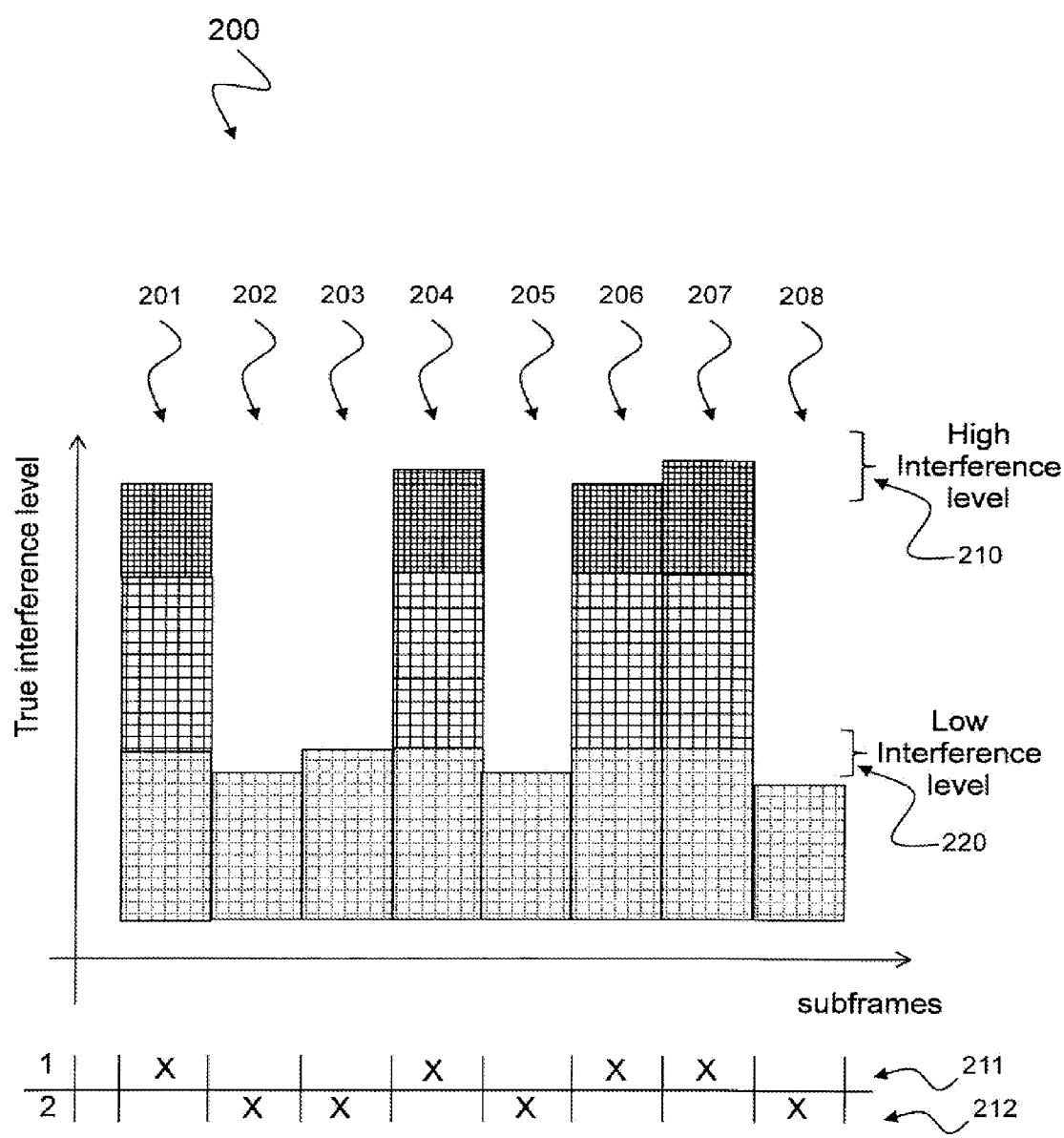
FIG. 2 is a schematic diagram illustrating interference levels 200 in almost blank sub-frames (ABS) and non-ABS sub-frames of a cellular network.

FIG. 2 is a schematic diagram illustrating interference levels 200 in Almost Blank Sub-frames (ABS) and non-ABS sub-frames of a cellular network. From the description above with respect to FIG. 1 it can be seen that in eICIC use-cases the UE 107 may be subject to strong interference fluctuations between subframes, as e.g. due to subframes with strong interference alternating with subframes with significantly lower interference (ABS). Hence, the eNodeB 103 may signal two so-called time domain measurement subframe restriction sets 211, 212 to the UE 107. These restriction sets 211, 212 may be defined as two mutually exclusive N bits patterns, where each pattern may represent a periodically repeating series of N subframes. The subframes belonging to a particular set may be those corresponding to bits set to a value of 1. The underlying idea is that the subframes in each set may roughly correspond to the same interference case. Subframes belonging to one set 212 might thus be low-interference 220 subframes (ABS) while those of the other set 211 may have high interference 210 (non-ABS) as depicted in FIG. 2. Here, a second 202, third 203, fifth 205 and eighth 208 subframe may experience a low interference level 220 and thus may belong to the second set 212 while a first 201, fourth 204, sixth 206 and seventh 207 subframe may experience a high interference level 210 and thus may belong to the first set 211. The methods and devices as described below with respect to FIGS. 4, 5 and 6 may be applied in such scenarios of different interference levels 200.

Figure 3:
FIG. 3 is a schematic diagram of a composite signal 300 including resource elements in a two-dimensional time-frequency representation.

If an interfering eNB transmits in ABS-mode, only Cell specific Reference Signals (CRS), synchronization signals and broadcast messages may be transmitted to enable full backward compatibility for Rel-8 UE. The transmission of CRS may cause unwanted interference on PHICH, PCFICH, PDCCH and PDSCH. FIG. 3 below illustrates the Resource Elements (REs) of different physical channels that may be affected by CRS interference from non-colliding aggressors.

FIG. 3 is a schematic diagram of a composite signal 300 that may include resource elements in a two-dimensional time-frequency representation. The horizontal axis may denote the time samples and the vertical axis may denote the frequency. The signal pattern may include data signals "D", control signals "C", and reference signals "R0", "R1", "R2", "R3", "R4" and "R5". In one example, data and control signals may be not distorted by aggressor cells.

The two-dimensional signal pattern may also be denoted as "resource block" or more particular as "RBSF" (Resource Block Sub Frame). An RBSF may be defined as a block that may have a length of one resource block (e.g. 180 kHz) in the frequency direction and a length of one subframe (e.g. 1 ms) in the time direction.

The two-dimensional time-frequency representation of the composite signal 300 may be specified according to 3GPP technical specification 36.211, e.g. version V8.4.0 or higher. In an ABS scenario, only LTE Rel-8 cell specific reference signals (CRS), synchronization signals and broadcast messages may be transmitted to enable full backward compatibility. The transmission of CRS, however, may cause unwanted interference on PHICH, PCFICH, PDCCH and PDSCH in the midst of this "interference-free tunnel". FIG. 3 illustrates the REs of different physical channels that may be affected by CRS interference from non-colliding aggressors.

The symbols "R0" may denote CRS antenna port 0 of target cell with CRS-shift 0. The symbols "R3" may denote CRS antenna port 1 of target cell with CRS-shift 0. The symbols "D" may denote data REs with no CRS interference from aggressors. The symbols "C" may denote PDCCH REs with no CRS interference from aggressors. The symbols "R1" may denote Data/PDCCH REs with CRS interference from aggressor at antenna port 0 and CRS-shift 1. The symbols "R4" may denote Data/PDCCH REs with CRS interference from aggressor at antenna port 1 and CRS-shift 1. The symbols "R2" may denote Data/PDCCH REs with CRS interference from aggressor at antenna port 0 and CRS-shift 2. The symbols "R5" may denote Data/PDCCH REs with CRS interference from aggressor at antenna port 1 and CRS-shift 2.

In one example, the two-dimensional signal pattern 300 may include a resource block of an Orthogonal Frequency Division Multiplexing system. In one example, the received signal may include a radio signal including a plurality of radio frames, each radio frame including a plurality of sub-frames and each sub-frame including a plurality of subcarriers. In one example, the target cell and the interfering cell may be dimensioned according to an LTE standardization, in particular to Release 10 or higher thereof, including eICIC. In one example, the target cell may be a pico cell and the interfering cell may be a macro cell of a heterogeneous LTE network as described above with respect to FIG. 1.

In a time-domain eICIC scenario with non-colliding Common Reference Signals (CRS), a UE at the cell boundary of a victim cell may be scheduled during ABS sub-frames of the aggressor cells. During an ABS sub-frame, the interference for PDSCH transmission may be reduced significantly. However, the aggressor cells may continue to transmit CRS signals. The CRS signals do not necessarily collide with the CRS signals of the victim cell and may present a significant disturbance for the PDSCH and PDCCH transmission. In FIG. 3, one exemplary RBSF received at a UE is illustrated. In a time-domain eICIC scenario with colliding common reference signals (CRS), which is not depicted in FIG. 3, two reference signals of different interfering cells may collide and the signal pattern may include reference signals of these two interfering cells at time-frequency positions.

It can be observed from FIG. 3 that REs of the target cell can be classified according to interference structure and levels experienced by them as follows.

A) CRS, PDCCH & PDSCH REs without interference from aggressors, e.g. receiver noise only. The noise covariance of the corresponding REs may be as follows $$R_n \approx \sigma_n^2 I \quad (2)$$

where $\sigma_n^2$ is the variance of an AWGN channel.

B) PDCCH & PDSCH REs that experience CRS interference from the aggressors. The interference and noise covariance matrix at data REs hit by CRS of aggressors (Antenna port-i & CRS shift-v) may be as follows $$R_n^{v,AP-i} = \sum_{j=1}^{N_v} h_{j,AP-i} h_{j,AP-i}^H + \sigma_n^2 I \quad (3)$$

where $N_V$ is the number of aggressors with CRS shift V and $h_{j,AP-i}$ is the channel of the j-th aggressor from antenna port AP-i.

Figure 6:
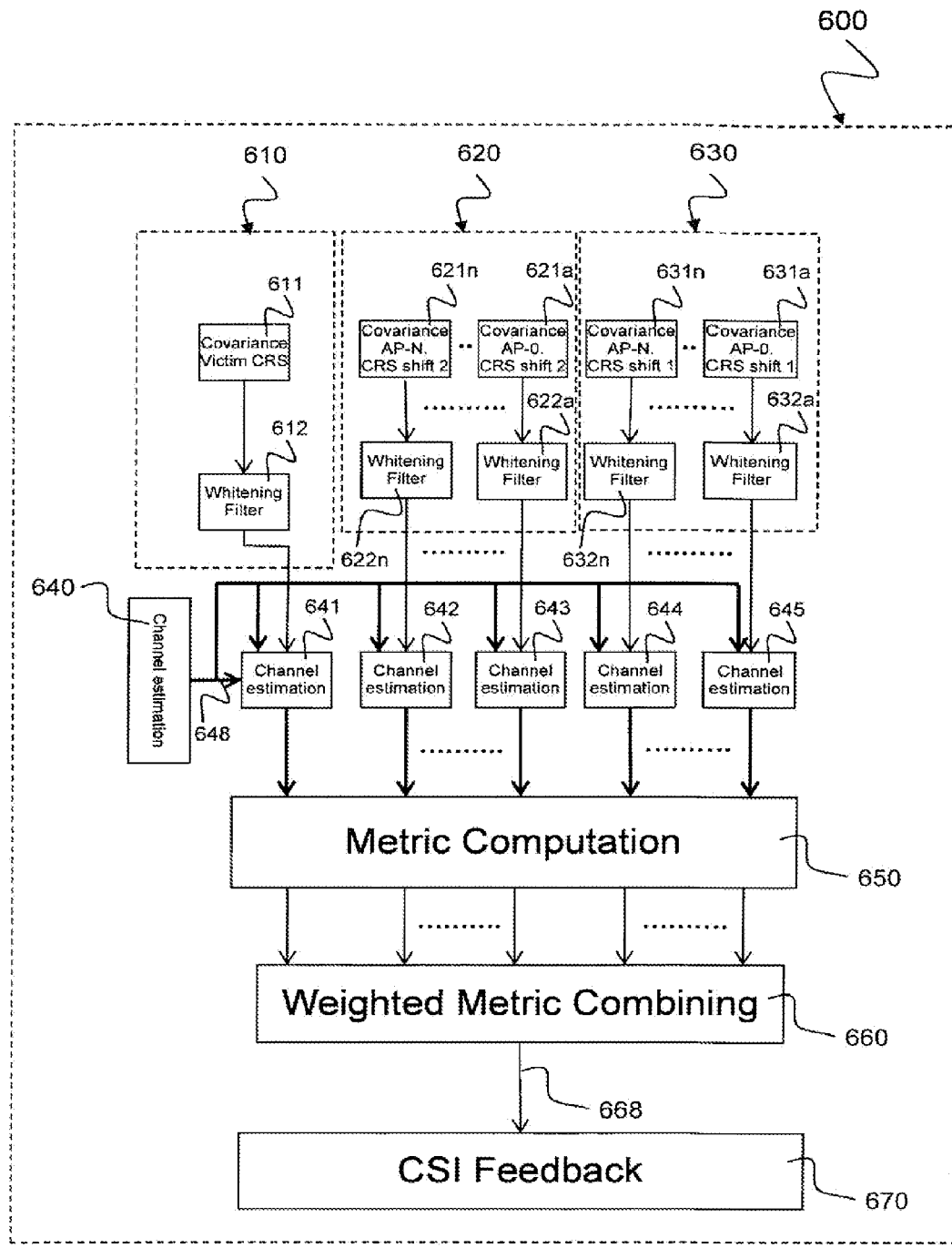
FIG. 6 is a schematic diagram of an advanced receiver 600 using CSI feedback by weighted metric combining (WMC) in accordance with the disclosure.

The methods and devices described in the following disclose a CSI feedback estimation scheme which may consider the CRS interference caused by non-colliding aggressors to enable accurate link adaptation. These methods and devices may use a combination of mutual information from disturbed and undisturbed resource elements and may therefore be denoted as "Weighted Metric Combining (WMC)" methods and devices. FIG. 6 described below depicts such an exemplary WMC device 600 in the presence of two non-colliding aggressors with different CRS shifts.

Figure 4:
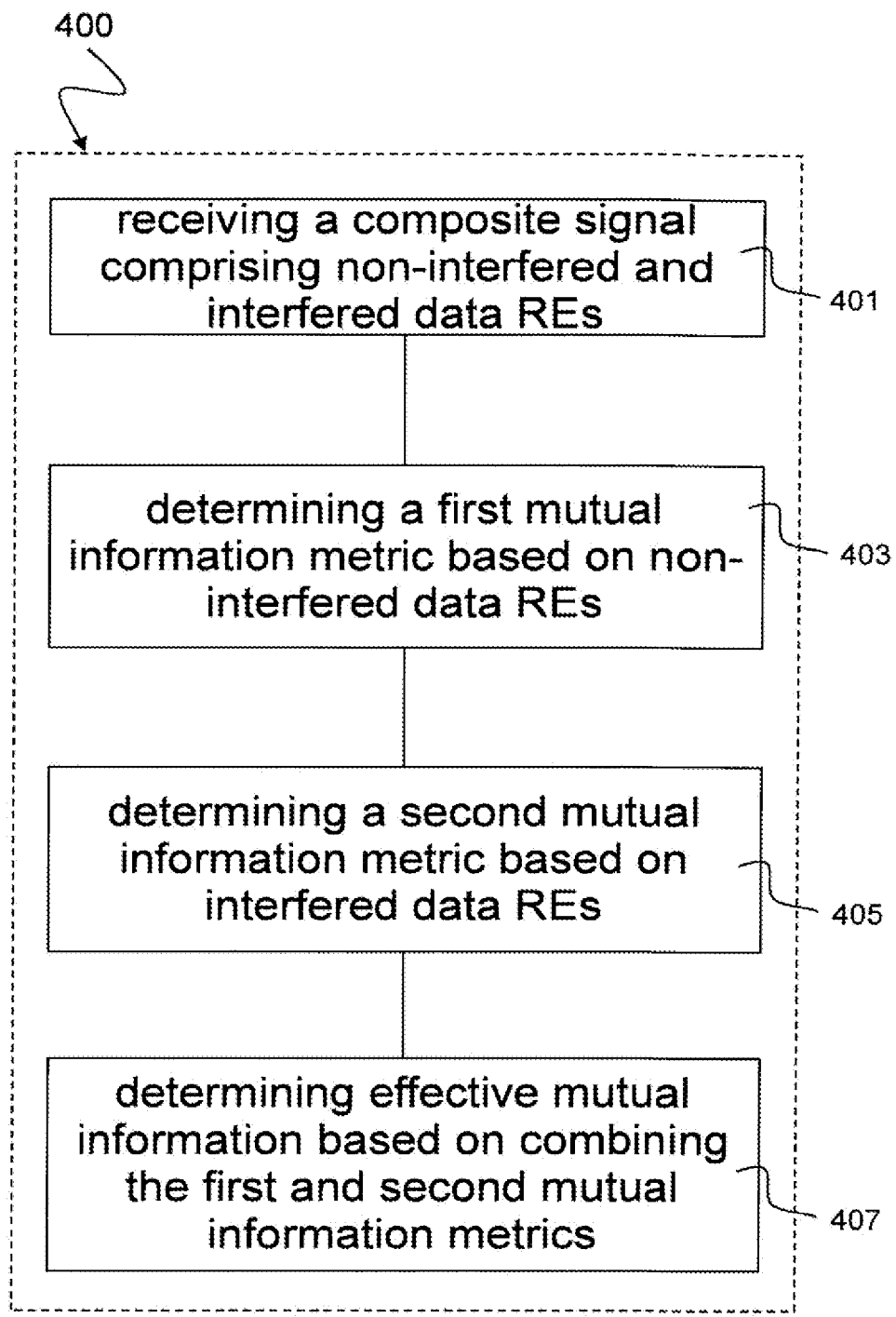
FIG. 4 is a schematic diagram of a method 400 in accordance with the disclosure for determining mutual information based on a composite signal.

FIG. 4 is a schematic diagram of a method 400 in accordance with the disclosure for determining effective mutual information based on a composite signal. The method 400 may include receiving at a receiver circuit a composite signal (see 401) including non-interfered data resource elements and interfered data resource elements from a plurality of radio cells. The method 400 may further include determining a first mutual information metric (see 403) based on the non-interfered data resource elements. The method 400 may further include determining a second mutual information metric (see 405) based on the interfered data resource elements. The method 400 may further include determining effective mutual information (see 407) based on a combination of the first mutual information metric and the second mutual information metric. The first and/or second mutual information metric may be determined as one or a combination of the exemplary mutual information metrics described above, in particular based on the mutual information functions $I_2(\gamma)$, $I_4(\gamma)$ and $I_6(\gamma)$ as described above with respect to table 1.

In an exemplary implementation, the method 400 may include determining the second mutual information metric (see 405) with respect to cell-specific information received from the plurality of radio cells included in the data resource elements of the composite signal 401. In an exemplary implementation, the method 400 may include determining the second mutual information metric (see 405) with respect to an antenna port and a reference signal shift included in the cell-specific information. In an exemplary implementation, the method 400 may include determining channel estimates based on a noise and interference covariance measure. In an exemplary implementation, the method 400 may include determining the channel estimates based on a Cholesky decomposition of the noise and interference covariance measure. In an exemplary implementation, the method 400 may include determining the channel estimates based on a power offset between the interfered data resource elements and a cell-specific reference signal received from a target radio cell included in the composite signal. In an exemplary implementation, the method 400 may include determining a signal-to-interference-and-noise ratio based on the channel estimates, in particular determining the SINR for a particular subcarrier of a plurality of subcarriers. In an exemplary implementation, the method 400 may include that determining the signal-to-interference-and-noise ratio is based on at least one of a modulation type, a precoder, and a rank, for example as described below. In an exemplary implementation, the method 400 may include that determining the second mutual information metric (see 405) is based on a function of the signal-to-interference-and-noise ratio, for example as described below. In an exemplary implementation, the method 400 may include that the function depends on the modulation type. In an exemplary implementation, the method 400 may include averaging the function over at least a subset of the plurality of subcarriers.

In an exemplary implementation, the method 400 may include weighting the first mutual information metric with respect to a number of the non-interfered data resource elements and/or weighting the second mutual information metric with respect to a number of the interfered data resource elements. In an exemplary implementation, the method 400 may include puncturing the second mutual information metric by using a weighting of zero, for example as described below with respect to equation (10). In an exemplary implementation, the method 400 may include determining the effective mutual information based on a sum of the weighted first mutual information metric and the weighted second mutual information metric, for example as described below. In an exemplary implementation, the method 400 may include determining for each precoder and each rank a maximum weighted mutual information based on the effective mutual information (see 407) subject to a maximum criterion with respect to modulation types, for example as described below. In an exemplary implementation, the method 400 may include determining for each rank an optimal precoder and corresponding effective mutual information based on a maximum criterion with respect to a sum of the maximum weighted mutual information over the precoders, for example as described below. In an exemplary implementation, the method 400 may include mapping the effective mutual information (see 407) of the optimal precoders for each rank to a channel quality indicator table, for example as described below. In an exemplary implementation, the method 400 may include determining a rank identifier configured to identify a rank optimizing a user equipment throughput, for example as described below. In an exemplary implementation, the method 400 may include reporting at least one of the optimal precoder, the corresponding effective mutual information, and the rank identifier.

In one example, the method 400 may include any one of the blocks 1 to 7 and any one of their sub-blocks as described in the following.

Block 1: Estimating the mutual information metric for the data REs not hit by CRS interference including the following sub-blocks:

Sub-block 1a: Estimating Noise covariance matrix $\hat{R}_n$ according to equation (1);

Sub-block 1b: Computing normalized channel estimates $\tilde{H}$ based on $\hat{R}_n$ as shown in the following.

$$\tilde{H} = \sqrt{\rho_a} L^{-1} H_{target}, \quad (4)$$

where $H_{target}$ is the channel estimate of the target cell based on CRS or CSI-RS and is of dimension $N_{Rx} \times N_{Tx}$, L is the Cholesky decomposition of the noise covariance matrix $R_n$, and $\rho_a$ is the power offset between CRS and data REs in OFDM symbols without CRS as specified by 3GPP.

Sub-block 1c: Computing the Mutual information metric for all the precoders and modulation types in rank-l (l in LTE could be from 1 to 4, for example) as follows. This sub-block may be repeated for all supported rank hypotheses.

$$MI_{P_j,l,QPSK} = E(I_2(SINR_{P_j}^{isc})) \times 2$$

$$MI_{P_j,l,16-QAM} = E(I_4(SINR_{P_j}^{isc})) \times 4$$

$$MI_{P_j,l,64-QAM} = E(I_6(SINR_{P_j}^{isc})) \times 6 \quad (5)$$

where

E( ) is the expectation operator, $I_2, I_4, I_6$ is the modulation dependent mutual information metric per bit and can be calculated online or by using a look up table, $SINR_{P_j}^{isc}$ is the computed post-equalization SINR for a particular subcarrier based on normalized channel estimates $\tilde{H}$ and conditioned on precoder $P_j$, $MI_{P_j,l,M}$ is the mean mutual information for modulation M and rank 1 conditioned on precoder $P_j$, $MI_{P_j,l,M}$, $SINR_{P_j}^{isc}$ are of dimension $N_l \times 1$, $N_l$ is the number of layers, and $i_{sc}$ is the subcarrier index.

Block 2: Computing Mutual information for data REs hit by aggressor CRS from AP-I and CRS shift-v including the following sub-blocks. This block may be repeated for different CRS shifts and antenna ports.

Sub-block 2a: Estimating the noise and interference covariance matrix $\hat{R}_n^{v,AP-i}$ which may reflect the interference experienced by the data REs. Different exemplary methods for estimating this noise and interference covariance matrix $\hat{R}_n^{v,AP-i}$ on data REs hit by CRS interference are described below with respect to FIG. 4.

Sub-block 2b: Computing normalized channel estimates $\tilde{H}_{v,AP-i}$ based on $\hat{R}_n^{v,AP-i}$ as shown in the following.

$$\tilde{H}_{v,AP-i} = \sqrt{\rho_b} L_{v,AP-i}^{-1} H_{target}, \quad (6)$$

where $H_{target}$ is the channel estimate based on the target cell based on CRS or CSI-RS and is of dimension $N_{Rx} \times N_{Tx}$, $L_{v,AP-i}$ is the Cholesky decomposition of the noise and interference covariance matrix $R_n^{v,AP-i}$, and $\rho_b$ is the power offset between CRS and data REs in OFDM symbols with CRS as specified by 3GPP.

Sub-block 2c: Computing the Mutual information metric for all the precoders and modulation types in rank-I (I in LTE could be from 1 to 4, for example) as follows. This sub-block may be repeated for all supported ranks.

$$MI_{P_j,l,QPSK}^{v,AP-i} = E(I_2(SINR_{P_j,v,AP-i}^{isc})) \times 2$$

$$MI_{P_j,l,16-QAM}^{v,AP-i} = E(I_4(SINR_{P_j,v,AP-i}^{isc})) \times 4$$

$$MI_{P_j,l,64-QAM}^{v,AP-i} = E(I_6(SINR_{P_j,v,AP-i}^{isc})) \times 6 \quad (7)$$

where $I_2, I_4, I_6$ is the modulation dependent mutual information metric and can be calculated online or by using a look up table, $SINR_{P_j,v,AP-i}^{isc}$ is the computed SINR for a particular subcarrier based on normalized channel estimates $\tilde{H}_{v,AP-i}$ and conditioned on precoder $P_j$, $MI_{P_j,l,M}^{v,AP-i}$ is the mean mutual information for modulation M and rank 1 conditioned on precoder $P_j$, $MI_{P_j,l,M}$, $SINR_{P_j}^{isc}$ are of dimension $N_l \times 1$, and $N_l$ is the number of layers.

Block 3: Weighted metric combining of mutual information to get the effective mutual information M for the subframe including the following sub-blocks. This combining may be done for all modulation, precoders and ranks.

$$MI_{P_j,l,M}^{WMC} = \underbrace{MI_{P_j,l,M} \frac{N_{Unhit}}{N_{Total}}}_{\text{MI of data REs with no CRS interference}} + \underbrace{\sum_{v=1}^{N_v} \sum_{AP-i=1}^{N_{AP}} MI_{P_j,l,M}^{v,AP-i} \frac{N_{hit}^{v,AP-i}}{N_{Total}}}_{\text{MI of data REs hit by CRS interference}}, \quad (8)$$

where $MI_{P_j,l,M}^{WMC}$ is the combined mutual information for modulation M and rank −1 conditioned on precoder $P_j$, $N_{Total}$ is the total number of data REs in a subframe, $N_{Unhit}$ is the number of data REs not hit by CRS of non-colliding aggressors, and $N_{hit}^{v,AP-i}$ is the number of data REs hit be CRS of non-colliding aggressors from AP-i in CRS shift v.

Block 4: Computing the maximum achievable MI $MI_{P_j,l,OPT}^{WMC}$ for each precoder for rank-l as shown in the following. This block may be repeated over all ranks.

$$MI_{P_j,l,OPT}^{WMC} = \max \begin{pmatrix} MI_{P_j,l,QPSK}^{WMC} \\ MI_{P_j,l,16-QAM}^{WMC} \\ MI_{P_j,l,64-QAM}^{WMC} \end{pmatrix} \quad (9)$$

Block 5: Computing optimal precoder and corresponding MI for each rank as $P_{Opt,1}$=arg max$_{j\in 1 \ldots N_{CB}}$ ($\Sigma MI_{P_j,l,OPT}^{WMC}$) where $N_{CB}$ is the number of precoding matrices in the codebook.

Block 6: Using the estimated MI for the optimal precoders for each rank-l to compute the CQI by mapping the MI to a CQI table.

Block 7: Estimating the rank which optimizes the UE throughput. The corresponding rank may be reported as RI (Rank Identifier). The optimal PMI and CQI conditioned on the rank may also be reported.

In one example, the method 400 may include any one of the blocks 1 and 4 to 7 as described above. In this example, the mutual information of data REs hit by CRS interference as described by blocks 2 and 3 may be marked as erasures (zeros) as described by the following equation.

$$MI_{P_j,l,M}^{WMC} = \underbrace{MI_{P_j,l,M} \frac{N_{Unhit}}{N_{Total}}}_{\text{MI of data REs with no CRS interference}} + \underbrace{\sum_{v=1}^{N_v} \sum_{AP-i=1}^{N_{AP}} MI_{P_j,l,M}^{v,AP-i} \frac{0}{N_{Total}}}_{\text{MI of data REs hit by CRS interference marked as erasures}} \quad (10)$$

$$= MI_{P_j,l,M} \frac{N_{Unhit}}{N_{Total}}$$

Equation (10) may describe a low complexity variant denoted herein after as "CSI-puncturing" where the estimation of the noise and interference covariance matrix of REs hit by CRS interference may not necessarily be needed. The algorithm may be similar to WMC described above, but the blocks 2 and 3 can be replaced by setting the mutual information of data REs hit by CRS interference to zero, i.e. blocks 2 and 3 can be saved thereby saving complexity.

By puncturing, data REs with high CRS interference can be marked as erasures. RSSI on data REs with CRS interference (of a particular shift) and data REs with no CRS interference can be compared in order to decide whether to puncture or not to puncture the mutual information metrics. CSI puncturing may be particularly useful for the following receivers: CRS puncturing receivers, receivers with no CRS interference mitigation capabilities, and CRS interference rejection receivers which may use data based covariance matrix estimates and may not be used for CSI feedback.

In the following, different exemplary methods for estimating or determining the noise and interference covariance matrix $\hat{R}_n^{v,AP-i}$ are described. Such methods may be used in Block 2a as described above. Depending on the kind of CRS interference handling of the receiver, one or more of these methods may be used.

With respect to interference rejection receivers, the noise and interference covariance matrix $\hat{R}_n^{v,AP-i}$ can be determined as described in the following examples.

In a first example, that may be called "parametric interference mitigation", the Noise and interference covariance matrix for data REs hit by aggressor CRS from AP i and CRS shift v can be computed according to $$R_n^{v,AP-i} = \sum_{j=1}^{N_v} \hat{h}_{j,AP-i} \hat{h}_{j,AP-i}^H + \hat{R}_n^{NoInterf} \quad (E1)$$

$$\approx \sum_{j=1}^{N_v} h_{j,AP-i} h_{j,AP-i}^H + \sigma_n^2 I$$

where $N_v$ is the number of dominating aggressors with CRS shift v and $\hat{h}_{j,AP-i}^H$ is the channel of the j-th aggressor from antenna port AP-I and $\hat{R}_n^{NoInterf}$ is the noise-covariance based on CRS or DMRS of the target cell according to $$\hat{R}_n^{NoInterf} = E[(y_p - \hat{h}_p x_p)(y_p - \hat{h}_p x_p)^H] \approx \sigma_n^2 I \quad (E2)$$

where $y_p$ is the received pilot signal, $\hat{h}_p$ is the estimated channel of the target cell and $x_p$ is the known pilot signal.

In a second example, the Noise and interference covariance matrix for data REs hit by aggressor CRS from AP i and CRS shift v can be computed according to $$R_n^{v,AP-i} = \sum_{j=1}^{N_v} \hat{\sigma}_{h,j,AP-i}^2 I + \hat{R}_n^{NoInterf} \approx \sum_{j=1}^{N_v} \sigma_{h,j,AP-i}^2 I + \sigma_n^2 I \quad (E3)$$

where $N_v$ is the number of dominating aggressors with CRS shift v, $\hat{\sigma}_{h,j,AP-i}^2$ is the estimated CRS interference power of the j-th aggressor from antenna port AP-I. The noise-covariance $\hat{R}_n^{NoInterf}$ in equation (E7) based on CRS or DMRS of the target cell can be computed as follows $$\hat{R}_n^{NoInterf} = E[(y_p - \hat{h} x_p)(y_p - \hat{h} x_p)^H] \approx \sigma_n^2 I, \quad (E4)$$

where $y_p$ is the received pilot signal,
$\hat{h}_p$ is the estimated channel of the target cell,
$x_p$ is the known pilot signal.

The CRS interference power estimation $\hat{\sigma}_{h,j,AP-i}^2$ in equation (E7) from AP-I can be estimated according to a "pilot difference based power estimation" algorithm as described in the following $$M_2 = E(\hat{h}_i^H \hat{h}_i) = E(h_i^H h_i) + \sigma_{e,i}^2,$$

$$\hat{\sigma}_{h,j,AP-i}^2 = M_2 - \hat{\sigma}_{e,i}^2 \quad (E5)$$

where $M_2$ denotes the signal plus noise power and $\hat{\sigma}_{h,i}^2$ denotes the interference power from antenna port AP-i.

The interference and noise power $\hat{\sigma}_{e,i}^2$ experienced by the pilots (AP-i) of the aggressor in equation (E8) can be computed as follows $$\hat{\sigma}_{e,i}^2 = \frac{1}{2} E(e_i(n, n-1)^H e_i(n, n-1)) \quad (E6)$$

$$= \frac{1}{2} (E(e_i^H(n) e_i(n)) + E(e_i(n-1) e_i^H(n-1)) + n_{estbias})$$

$$= \frac{1}{2} (2\sigma_{e,i}^2 + n_{estbias})$$

$$\approx 2\sigma_{e,i}^2,$$

where $$n_{estbias} = E\left(\sqrt{\sigma_{e,i}^2(n)\sigma_{e,i}^2(n-1)} \, \text{corr}(e_i(n), e_i(n-1))\right) \quad (E7)$$

$$= E(\sigma_{e,i}^2 \text{corr}(e_i(n), e_i(n-1)))$$

and $\hat{\sigma}_{e,i}^2$ denotes the noise power estimate.

The difference $e_i(n,n-1)$ in equations (E9) and (E10) between two neighboring demodulated pilots (AP-i) of the aggressor, where AP-i denotes the antenna port no. i, e.g. 1 to 4, can be computed as follows $$e_i(n,n-1)=\tilde{h}_i(n)-\tilde{h}_i(n-1)=e_i(n)-e_i(n-1)$$

$$\tilde{h}_i(n)=h_i(n)+e_i(n)$$

$$\tilde{h}_i(n-1)=h_i(n-1)+e(n-1) \quad (E8)$$

where
$\tilde{h}_i(n)$ denotes the demodulated pilot at sub-carrier n and $\tilde{h}_i(n-1)$ denotes the demodulated pilot at sub-carrier n−1.

Alternatively, the CRS interference power estimation $\tilde{\sigma}_{h,i,AP-i}^2$ in equation (E7) from AP-I can be estimated according to an "M1M2 power estimation" algorithm as described in the following $$\tilde{\sigma}_{h,i,AP-i}^2 = M_2 - M_1, \quad (E9)$$

where the second-order moment $M_2$ on the demodulated pilots (AP-i) of the aggressor, where AP-i denotes the antenna port no. i, e.g. 1 to 4, can be expressed as $$M_2 = E(|\Re(\tilde{h}_i(n) \times \tilde{h}_i^*(n-1))|) \quad (E10)$$

$$= E(\|\tilde{h}_i\|^2) + E\left(\sqrt{\|\tilde{h}_i\|^2 + \sigma_{e,i}^2}\right) + E\left(\frac{\sigma_{e,i}^2}{2}\right)$$

where $\Re(\bullet)$ denotes the real operator and the first-order moment $M_1$ on the demodulated pilots (AP-i) of the aggressor can be expressed as $$M_1 = E(|\Im(\tilde{h}_i(n) \times \tilde{h}_i^*(n-1))|) \quad (E11)$$

$$= E\left(\sqrt{\|\tilde{h}_i\|^2 + \sigma_{e,i}^2}\right) + E\left(\frac{\sigma_{e,i}^2}{2}\right)$$

where $\Im(\bullet)$ denotes the imaginary operator.

In a third example, the Noise and interference covariance matrix for data REs hit by aggressor CRS $\hat{\mathbb{S}}_{data}(I_{aggressor})$ from AP i and CRS shift v can be computed according to $$y = H_0 s_0 + \sum_{i \in I_{aggressor}} H_i s_i^{CRS} + n \quad (E12)$$

and $$\hat{R}_y^{data}(I_{aggressor}) = E[yy^H] \quad (E13)$$

$$= H_0 H_0^H + \sum_{i \in I_{aggressor}} H_i H_i^H + R_n$$

by assuming $E[s_l s_l^H]=I$ for all l and $E[s_m s_n^H]=0$ for all m≠n. This may be done individually for each applicant set $I_{aggressor}$. The $\mathbb{C}^{N_{tx} \times 1}$-valued random variable $s_i^{CRS}(k,l)$ may model the transmitted CRS signal for aggressor $i \in I_{aggressor}$ (k,l), and $H_i(k,l) \in \mathbb{C}^{N_{rx} \times N_{tx}}$ may be the corresponding channel matrices.

With respect to CRS scaling receivers, the noise and interference covariance matrix $\hat{R}_n^{v,AP-i}$ can be estimated as the scaled version of $\hat{R}_n$ as follows $$\hat{R}_n^{v,AP-i} = \gamma_n^{v,AP-i} \hat{R}_n \quad (11)$$

$$\gamma_n^{v,AP-i} = \frac{\sigma_{d,v,AP-i}^2}{\sigma_{d,Unhit}^2},$$

where
$\sigma_{d,Unhit}^2$ is the RSSI (received signal strength indicator) measured on data REs not hit by CRS interference, and
$\sigma_{d,v,AP-i}^2$ is the RSSI measured on data REs hit by CRS interference from aggressors of CRS shift v and antenna port i.

With respect to CRS canceling receivers, the noise and interference covariance matrix $\hat{R}_n^{v,AP-i}$ can be estimated as the scaled version of $\hat{R}_n$ as described in the following. As the residual interference and noise after CRS interference cancellation may not necessarily be negligible, three alternatives as described in the following can be applied to estimate the effective noise on data REs after CRS interference cancellation.

According to a first alternative, the estimation algorithm as described in the following can be applied to estimate the effective noise and interference covariance on data REs where aggressor-eNB CRS-interference has been canceled. For each antenna port used by an aggressor CRS signals, a separate Covariance Matrix may be computed. The following blocks may be required.

1. Estimate covariance matrix on CRS disturbed resource elements from $\hat{\mathbb{S}}_{data}(I_{aggressor})$ $$y = H_0 s_0 + \sum_{i \in I_{aggressor}} H_i s_i^{CRS} + n \quad (A1)$$

and $$\hat{R}_y^{data}(I_{aggressor}) = E[yy^H] \quad (A2)$$

$$= H_0 H_0^H + \sum_{i \in I_{aggressor}} H_i H_i^H + R_n$$

by assuming $E[s_l s_l^H]=I$ for all and $E[s_m s_n^H]=0$ for all m≠n. This may be done individually for each applicant set $I_{aggressor}$.

2. Estimate covariance matrix on CRS-RE of victim signal, i.e.

$$y = H_0 s_0^{CRS} + n \quad (A3)$$

and $$\hat{R}_y^{CRS} = E[yy^H] \quad (A4)$$

$$= H_0 H_0^H + R_n$$

3. Estimate noise in the same way as described above as Covariance Matrix Estimation for all RE without CRS Interference, i.e.

$$\hat{R}_n^{CRS} = R_n + R_{CE}. \quad (A5)$$

The effective noise and interference covariance estimate may be given by $$\hat{R}_{I+N}(I_{aggressor}) = \hat{R}_y^{data}(I_{aggressor}) - \hat{R}_y^{CRS} + \hat{R}_n^{CRS} \quad (A6)$$

$$= \sum_{i \in I_{aggressor}} H_i H_i^H + R_n + R_{CE}.$$

In equation (A6), the covariance matrix estimate may reflect the aggressor interference $H_iH_i^H$ components, the noise component $R_n$ and a channel estimation error dependent component $R_{CE}$.

According to a second alternative, the residual interference and noise caused due to channel estimation error of the canceled aggressors can be expressed as follows $$\hat{R}_n^{v,AP-i} = \hat{R}_n + \sigma_{residual-v,AP-i}^2 I \quad (12)$$

$$\sigma_{residual-v,AP-i}^2 = \sum_{k=1}^{N_{Agg}} \frac{\sigma_{k,v,AP-i}^2}{\gamma_k},$$

where $\sigma_{k,v,AP-i}^2$ is the noise measured on the pilots of the aggressor K (CRS shift v and antenna port i), $\gamma_k$ is the channel estimation filter gain for aggressor K, and $\sigma_{residual-v,AP-i}^2$ is the noise and residual interference on data REs after CRS interference cancellation of $N_{Agg}$ dominating aggressors in the particular shift v and antenna port i.

According to a third alternative, the similar principle as a CRS scaling receiver as in equation (11) may be applied, but with the exception that the RSSI $\sigma_{d,v,AP-i}^2$ may be measured on data REs after CRS interference cancelation.

Figure 5:
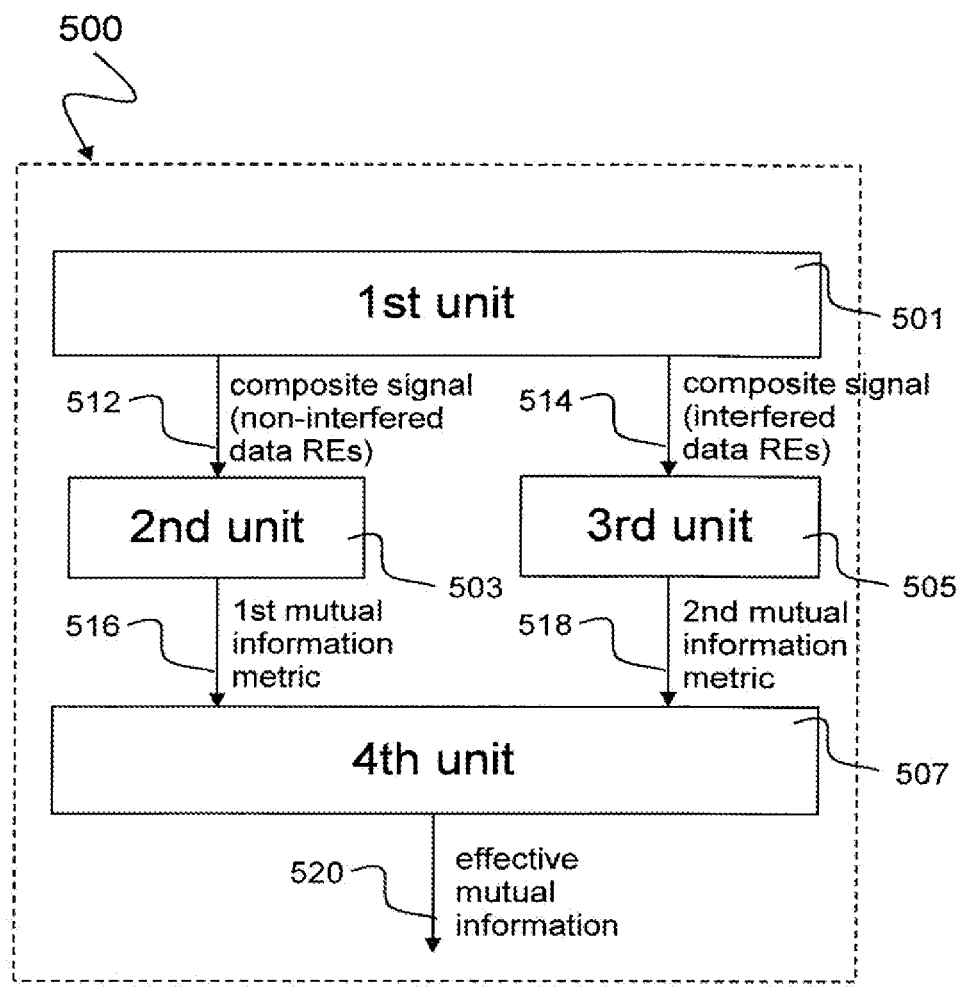
FIG. 5 is a schematic diagram of a device 500 in accordance with the disclosure for determining mutual information based on a composite signal.

FIG. 5 is a schematic diagram of a receiver circuit 500 in accordance with the disclosure for determining effective mutual information based on a composite signal.

The receiver circuit 500 may include a first unit 501 for receiving a composite signal including non-interfered data resource elements 512 and interfered 514 data resource elements from a plurality of radio cells. The receiver circuit 500 may further include a second unit 503 for determining a first mutual information metric 516 based on the non-interfered data resource elements 512. The receiver circuit 500 may further include a third unit 505 for determining a second mutual information metric 518 based on the interfered data resource elements 514. The receiver circuit 500 may further include a fourth unit 507 for determining effective mutual information 520 based on a combination of the first mutual information metric 516 and the second 518 mutual information metric.

In an exemplary implementation, the third unit 505 of the receiver circuit 500 may determine the second mutual information metric 518 based on a noise and interference covariance matrix of the interfered data resource elements 514 subject to an antenna port and a CRS shift configuration. In an exemplary implementation, the receiver circuit 500 may include a weighting unit 660 for determining the effective mutual information 520 based on a weighted sum of the first mutual information metric 516 and the second mutual information metric 518. In an exemplary implementation, the receiver circuit 500 may include a feedback unit for feeding back channel state information based on the effective mutual information 520. The receiver circuit 500 may implement the method 400 as described above with respect to FIG. 4.

FIG. 6 is a schematic diagram of an advanced receiver 600 using CSI feedback by Weighted Metric Combining (WMC) in accordance with the disclosure.

The receiver 600 may include a first preprocessing stage 610 for preprocessing undisturbed data REs, a second preprocessing stage 620 for preprocessing disturbed data REs of the second CRS shift with respect to antenna ports 1 to N and a third preprocessing stage 630 for preprocessing disturbed data REs of the first CRS shift with respect to antenna ports 1 to N. First and second CRS shifts and antenna ports are exemplarily illustrated in FIG. 3 described above. The first preprocessing stage 610 may include a noise and interference covariance estimator 611 for estimating the noise and interference covariance of the victim CRS and a whitening filter 612 for applying a spatial whitening filter operation to the estimated noise and interference covariance of the victim CRS.

The second preprocessing stage 620 may include for each antenna port AP-0 to AP-N a noise and interference covariance estimator 621a to 621n for estimating the noise and interference covariance of each disturbed data RE of the second CRS shift and a whitening filter 622a to 622n for applying a spatial whitening filter operation to each of the estimated noise and interference covariance of the disturbed data REs.

The third preprocessing stage 630 may include for each antenna port AP-0 to AP-N a noise and interference covariance estimator 631a to 631n for estimating the noise and interference covariance of each disturbed data RE of the first CRS shift and a whitening filter 632a to 632n for applying a spatial whitening filter operation to each of the estimated noise and interference covariance of the disturbed data REs.

The three preprocessing stages 610, 620, 630 may provide covariance matrices, e.g. per Resource Block (RB), for example nine covariance matrices per RB, which may be passed to channel estimation blocks 641, 642, 643, 644, 645 which may receive channel coefficient estimates by a channel estimation unit 640, e.g. 4 channel estimates per RB. In the channel estimation blocks 641, 642, 643, 644, 645, normalized channel estimates may be computed from the covariance matrices, e.g. 4 normalized channel estimates per RB which may be then passed to a metric computation unit 650 for performing de-precoding, SINR computation and metric computation per RB. The metric computation unit 650 may provide mutual information per RB, rank and modulation, e.g. 9 sets per RB which may be 864 values. This mutual information may be passed to the weighted metric combining unit 660 for computing weighted mutual information per RB and modulation, e.g. one set per RB according to 6×16 values. This weighted mutual information may be passed to a CSI feedback unit 670 for performing feedback of channel state information which may include sub-band and/or wideband averaging and PMI/CQI/RI computation.

In one example, the noise and interference covariance estimator 611 for estimating the noise and interference covariance of the victim CRS may estimate the noise and interference covariance according to sub-block 1a as described above with respect to FIG. 4 or with respect to equation (1) described above. In one example, the noise and interference covariance estimators 621a to 621n for estimating the noise and interference covariance for disturbed data REs of the second CRS shift with respect to antenna ports 1 to N may estimate the noise and interference covariance according to sub-block 2a as described above with respect to FIG. 4. In one example, the noise and interference covariance estimators 631a to 631n for estimating the noise and interference covariance for disturbed data REs of the first CRS shift with respect to antenna ports 1 to N may estimate the noise and interference covariance according to sub-block 2a as described above with respect to FIG. 4.

In one example, the channel estimation block 641 may estimate the channel coefficients according to sub-block 1b as described above with respect to FIG. 4. In one example, the channel estimation blocks 642, 643, 644, 645 may estimate the channel coefficients according to sub-block 2b as described above with respect to FIG. 4. In one example, the metric computation unit 650 may compute the metric according to sub-block 1c for the undisturbed data REs and according to sub-block 2c for the disturbed data REs as described above with respect to FIG. 4. In one example, the weighted metric combining unit 660 may compute the weighted mutual information according to block 3 as described above with respect to FIG. 4. In one example, the CSI feedback unit 670 may compute the feedback information according to one or more of blocks 4, 5, 6 and 7 as described above with respect to FIG. 4.

In one example, the first preprocessing stage 610 for preprocessing the undisturbed data REs, the channel estimation block 641 and the metric computation unit 650 for the undisturbed data REs may be implemented in the second unit 503 of a receiver circuit 500 as described above with respect to FIG. 5. In one example, the second and third preprocessing stages 620, 630 for preprocessing the disturbed data REs, the channel estimation blocks 642, 643, 644, 645 and the metric computation unit 650 for the disturbed data REs may be implemented in the third unit 505 of a receiver circuit 500 as described above with respect to FIG. 5. In one example, the weighted metric combining unit 660 and the CSI feedback unit 670 may be implemented in the fourth unit 507 of a receiver circuit 500 as described above with respect to FIG. 5.

The methods 400 and devices 500, 600 described above may fulfill the requirements for the support of time domain measurement subframe restrictions. CSI feedback measurements may reflect the receiver performance measurement-set specific. The interference measured on a subframe belonging to a particular set is not mixed with the interference measurement of a subframe belonging to another set.

With respect to FIGS. 7, 8, 9 and 10, link level simulations were performed to compare the performance of the disclosed methods and devices over CSI feedback schemes during ABS. The following configurations illustrated in Table 2 were used for the simulations:

TABLE 2 configurations used for simulations

| | |
|---|---|
| Bandwidth | 10 MHz |
| Transmission mode | TM4 |
| Antenna configuration | 2x2 Low correlation |
| Channel | EVA-5 Hz & EPA-5 Hz |
| Channel estimation | 2D-MMSE over 1 PRB, Estimated SINR, Ideal Doppler and Delay spread |
| Aggressor CRS shift | Non-Colliding |
| Interference models | 1. Fixed Interference to Noise ratio with aggressor SNR = 16 dB (16 dB above white noise) 2. Fixed Signal to Interference Ratio with SIR = −12 dB (Equivalent Cell range expansion = 12 dB) |
| CRS Interference rejection receiver | "Parametric interference mitigation" receiver as described above with respect to the first example (equations E1 and E2) of FIG. 4 |
| Link adaptation | Adaptive MCS and rank based on CQI/PMI/RI reports from the UE |

Figure 7:
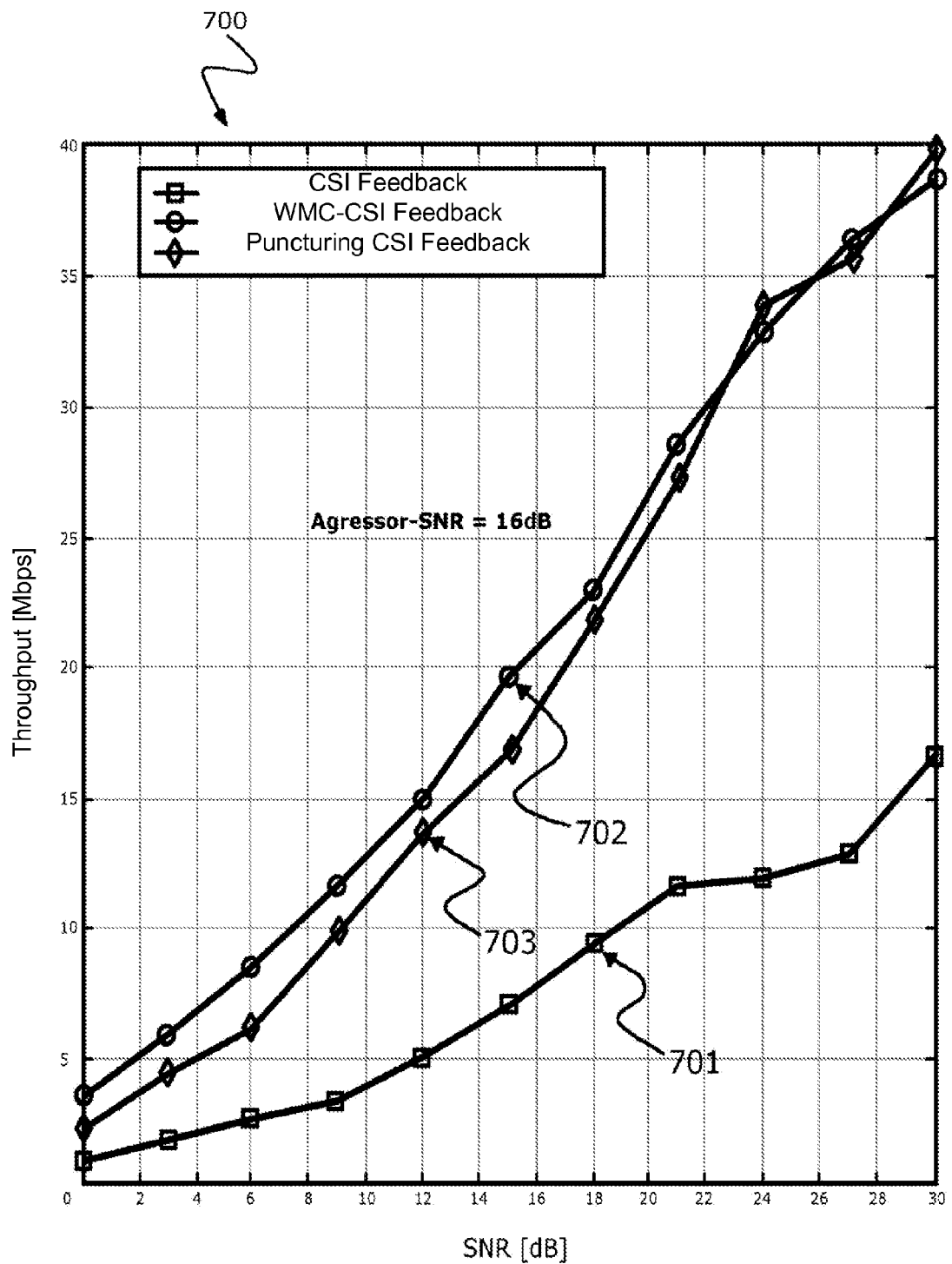
FIG. 7 is a performance diagram illustrating data throughput of a WMC CSI feedback receiver 702 and a puncturing CSI feedback receiver 703 versus a CSI feedback receiver 701 for an aggressor SNR of 16 dB and an EPA-5 channel.
Figure 8:
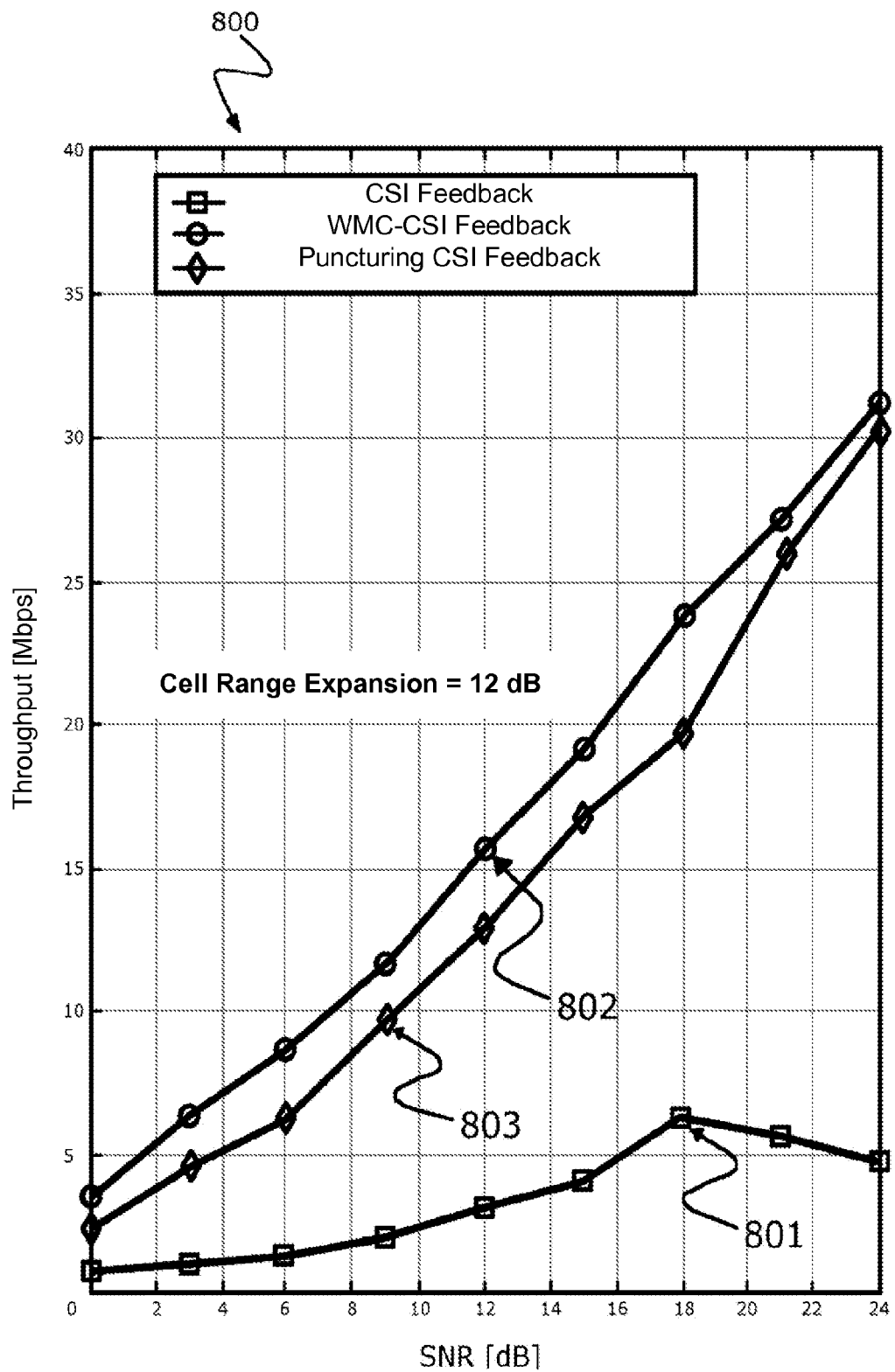
FIG. 8 is a performance diagram illustrating data throughput of a WMC CSI feedback receiver 802 and a puncturing CSI feedback receiver 803 versus a CSI feedback receiver 801 for a cell range expansion of 12 dB and an EPA-5 channel.
Figure 9:
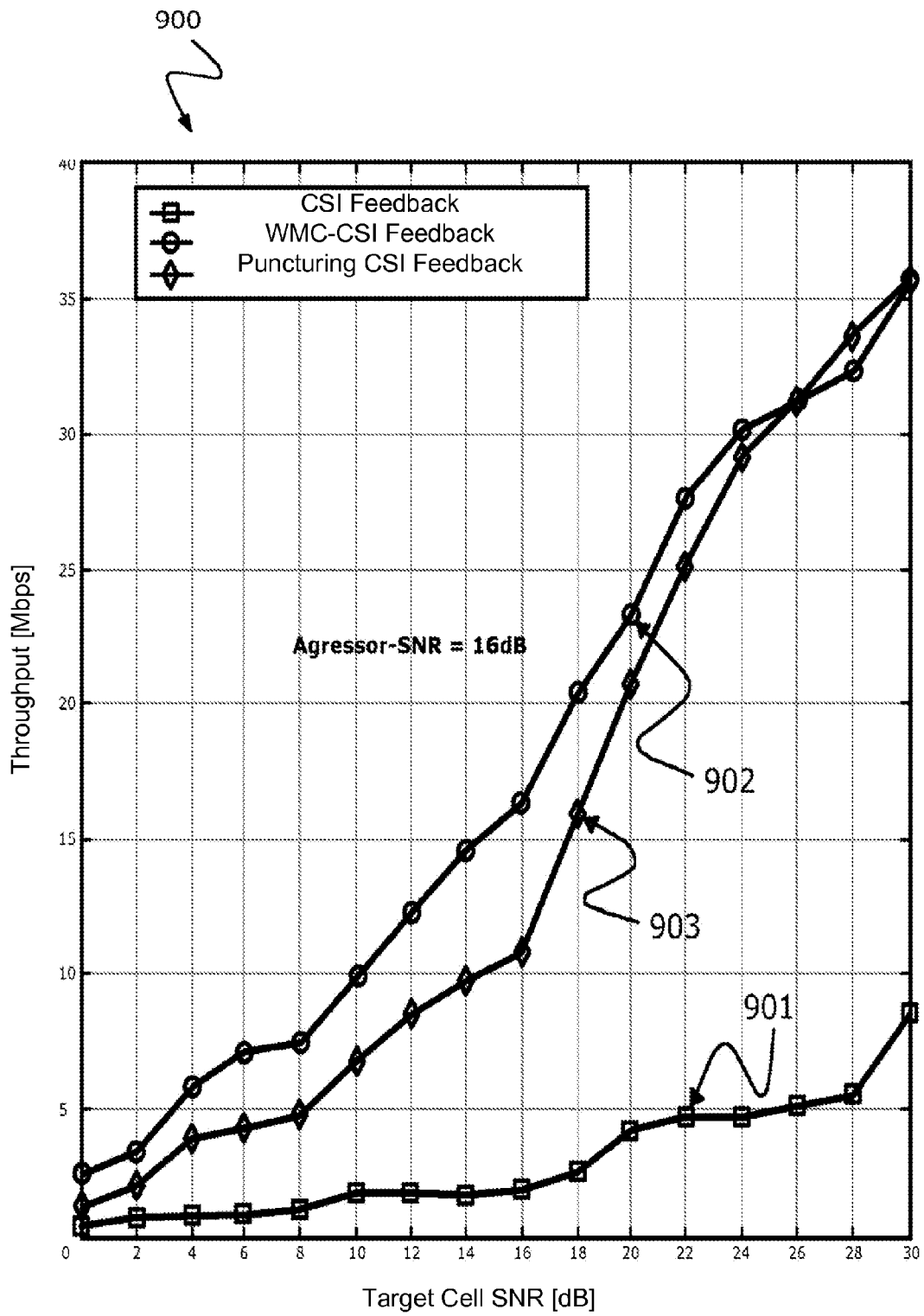
FIG. 9 is a performance diagram illustrating data throughput of a WMC CSI feedback receiver 902 and a puncturing CSI feedback receiver 903 versus a CSI feedback receiver 901 for an aggressor SNR of 16 dB and an EVA-5 channel.
Figure 10:
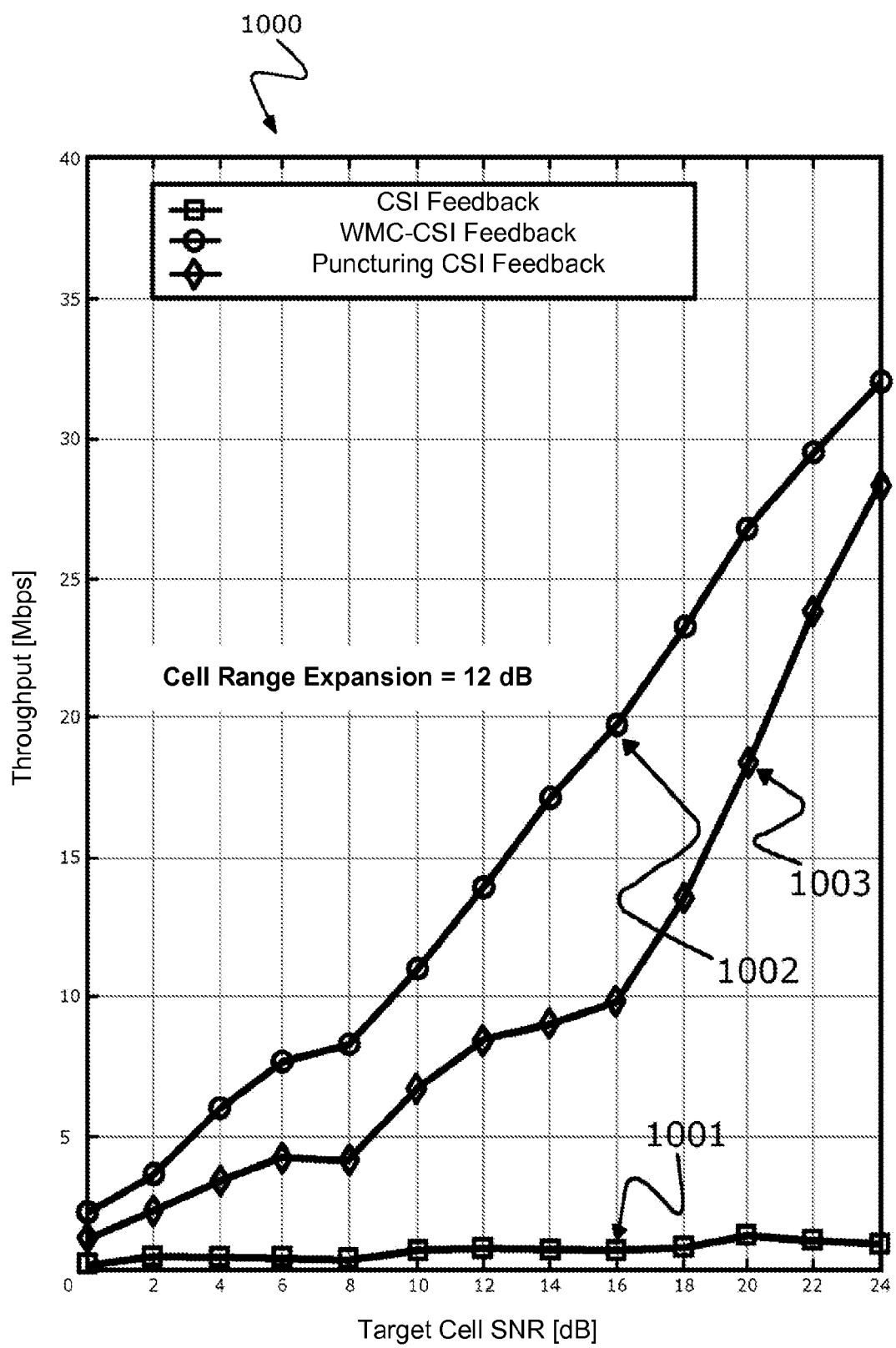
FIG. 10 is a performance diagram illustrating data throughput of a WMC CSI feedback receiver 1002 and a puncturing CSI feedback receiver 1003 versus a CSI feedback receiver 1001 for a cell range expansion of 12 dB and an EVA-5 channel.

FIG. 7 is the performance diagram illustrating data throughput of a WMC CSI feedback receiver 702 and a puncturing CSI feedback receiver 703 versus a CSI feedback receiver 701 for an aggressor SNR of 16 dB and an EPA-5 channel. FIG. 8 is the performance diagram illustrating data throughput of a WMC CSI feedback receiver 802 and a puncturing CSI feedback receiver 803 versus a CSI feedback receiver 801 for a cell range expansion of 12 dB and an EPA-5 channel. FIG. 9 is the performance diagram illustrating data throughput of a WMC CSI feedback receiver 902 and a puncturing CSI feedback receiver 903 versus a CSI feedback receiver 901 for an aggressor SNR of 16 dB and an EVA-5 channel. FIG. 10 is the performance diagram illustrating data throughput of a WMC CSI feedback receiver 1002 and a puncturing CSI feedback receiver 1003 versus a CSI feedback receiver 1001 for a cell range expansion of 12 dB and an EVA-5 channel.

The advantages of the disclosed methods and devices, i.e. the huge gains that may be obtained when using the CSI feedback computation schemes, are illustrated in FIGS. 7 to 10. The left plot shows the fixed INR whereas the right plot shows the fixed SIR case. As opposed to CSI computation schemes the achievable gains by employing advanced receivers applying the disclosed methods may be maintained by enabling accurate link adaptation.

Figure 11:
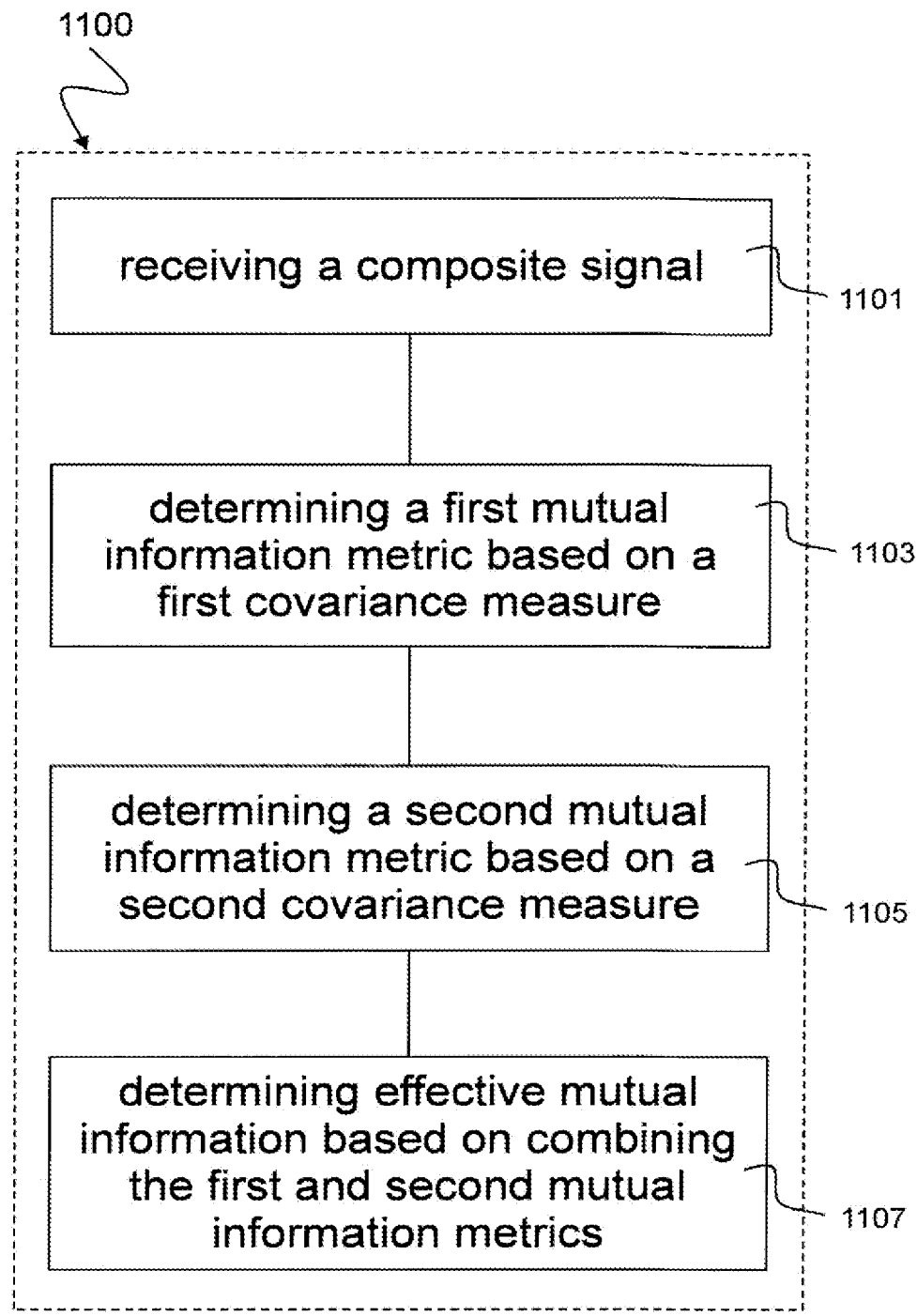
FIG. 11 is a schematic diagram of a method 1100 in accordance with the disclosure for determining effective mutual information based on a composite signal.

FIG. 11 is a schematic diagram of a method 1100 in accordance with the disclosure for determining effective mutual information based on a composite signal received at a receiver circuit, for example a receiver circuit 500 as described above with respect to FIG. 5. The method 1100 may include receiving a composite signal (see 1101) at a receiver circuit. The method 1100 may further include determining a first mutual information metric (see 1103) based on a first covariance measure. The method 1100 may further include determining a second mutual information metric (see 1105) based on a second covariance measure different from the first covariance measure. The method 1100 may further include determining effective mutual information (see 1107) based on a combination of the first mutual information metric and the second mutual information metric.

In an exemplary implementation of the method 1100, the composite signal may include non-interfered data resource elements and interfered data resource elements received from a plurality of radio cells. In an exemplary implementation of the method 1100, the determining the first mutual information metric (see 1103) may be based on the non-interfered data resource elements and the determining the second mutual information metric (see 1105) may be based on the interfered data resource elements. The covariance measure may be a covariance matrix and may be computed as described above with respect to FIG. 4.

By using the methods 400, 1100 and devices 500, 600 described above, different mutual information metrics may be estimated to reflect the channel quality experienced by data REs with and without CRS interference. Further, weighted combining of mutual information metrics may reflect the channel quality experience by data REs in the whole subframe. Different estimation methods of noise and interference covariance matrices for data REs hit by CRS interference may be based on the CRS mitigation receiver used on the demodulation path. In an implementation, CSI puncturing of data REs can be used to mark erasures, e.g. when noise and interference covariance is not available. The disclosed solution for PDSCH can also be applied for Radio Link Monitoring (RLM) for PDCCH. CSI feedback computation may reflect the actual channel quality during ABS and hence may enable accurate link adaptation. Gains due to advanced receivers may be maintained in link adaptation as opposed to CSI feedback schemes.

EXAMPLES

The following examples pertain to further embodiments. Example 1 is a method, comprising: receiving at a receiver circuit a composite signal comprising non-interfered data resource elements and interfered data resource elements from a plurality of radio cells; determining a first mutual information metric based on the non-interfered data resource elements; determining a second mutual information metric based on the interfered data resource elements; and determining effective mutual information based on a combination of the first mutual information metric and the second mutual information metric.

In Example 2, the subject matter of Example 1 can optionally include determining the second mutual information metric with respect to cell-specific information received from the plurality of radio cells comprised in the data resource elements of the composite signal.

In Example 3, the subject matter of Example 2 can optionally include determining the second mutual information metric with respect to an antenna port and a reference signal shift comprised in the cell-specific information.

In Example 4, the subject matter of Example 1 can optionally include determining channel estimates based on a noise and interference covariance measure.

In Example 5, the subject matter of Example 1 can optionally include determining the channel estimates based on a Cholesky decomposition of the noise and interference covariance measure.

In Example 6, the subject matter of any one of Examples 1-5 can optionally include determining the channel estimates based on a power offset between the interfered data resource elements and a cell-specific reference signal received from a target radio cell comprised in the composite signal.

In Example 7, the subject matter of any one of Examples 4-6 can optionally include determining a signal-to-interference-and-noise ratio based on the channel estimates for a particular subcarrier of a plurality of subcarriers.

In Example 8, the subject matter of Example 7 can optionally include that the determining the signal-to-interference-and-noise ratio is based on at least one of a modulation type, a precoder, and a rank.

In Example 9, the subject matter of any one of Examples 7-8 can optionally include that determining the second mutual information metric is based on a function of the signal-to-interference-and-noise ratio.

In Example 10, the subject matter of Example 9 can optionally include that the function depends on the modulation type.

In Example 11, the subject matter of any one of Examples 9-10 can optionally include averaging the function over at least a subset of the plurality of subcarriers.

In Example 12, the subject matter of any one of Examples 1-11 can optionally include weighting the first mutual information metric with respect to a number of the non-interfered data resource elements; and weighting the second mutual information metric with respect to a number of the interfered data resource elements.

In Example 13, the subject matter of Example 12 can optionally include puncturing the second mutual information metric by using a weighting of zero.

In Example 14, the subject matter of any one of Examples 12-13 can optionally include determining the effective mutual information based on a sum of the weighted first mutual information metric and the weighted second mutual information metric.

In Example 15, the subject matter of any one of Examples 1-14 can optionally include determining for each precoder and each rank a maximum weighted mutual information based on the effective mutual information subject to a maximum criterion with respect to modulation types.

In Example 16, the subject matter of Example 15 can optionally include determining for each rank an optimal precoder and corresponding effective mutual information based on a maximum criterion with respect to a sum of the maximum weighted mutual information over the precoders.

In Example 17, the subject matter of Example 16 can optionally include mapping the effective mutual information of the optimal precoders for each rank to a channel quality indicator table.

In Example 18, the subject matter of any one of Examples 1-17 can optionally include determining a rank identifier configured to identify a rank optimizing a user equipment throughput.

In Example 19, the subject matter of Example 18 can optionally include reporting at least one of the optimal precoder, the corresponding effective mutual information, and the rank identifier.

Example 20 is a receiver circuit, comprising: a first unit configured to receive a composite signal comprising non-interfered data resource elements and interfered data resource elements from a plurality of radio cells; a second unit configured to determine a first mutual information metric based on the non-interfered data resource elements; a third unit configured to determine a second mutual information metric based on the interfered data resource elements; and a fourth unit configured to determine effective mutual information based on a combination of the first mutual information metric and the second mutual information metric.

In Example 21, the subject matter of Example 20 can optionally include that the third unit is configured to determine the second mutual information metric based on a noise and interference covariance matrix of the interfered data resource elements subject to an antenna port and a CRS shift configuration.

In Example 22, the subject matter of any one of Examples 20-21 can optionally include a weighting unit configured to determine the effective mutual information based on a weighted sum of the first mutual information metric and the second mutual information metric.

In Example 23, the subject matter of any one of Examples 20-22 can optionally include a feedback unit configured to feedback channel state information based on the effective mutual information.

Example 24 is a method, comprising: receiving a composite signal at a receiver circuit; determining a first mutual information metric based on a first covariance measure; determining a second mutual information metric based on a second covariance measure different from the first covariance measure; and determining effective mutual information based on a combination of the first mutual information metric and the second mutual information metric.

In Example 25, the subject matter of Example 24 can optionally include that the composite signal comprises non-interfered data resource elements and interfered data resource elements received from a plurality of radio cells, wherein determining the first mutual information metric is based on the non-interfered data resource elements, and wherein determining the second mutual information metric is based on the interfered data resource elements.

Example 26 is a mobile device, comprising: a receiver circuit configured to receive a composite signal comprising non-interfered data resource elements and interfered data resource elements from a plurality of radio cells; a baseband circuit configured to determine a first mutual information metric based on the non-interfered data resource elements, a second mutual information metric based on the interfered data resource elements and effective mutual information based on a combination of the first mutual information metric and the second mutual information metric; and a transmitter circuit configured to modulate a baseband signal comprising the effective mutual information on a radio frequency carrier and to transmit the modulated baseband signal through an air link to a base station.

In Example 27, the subject matter of Example 26 can optionally include that the baseband circuit is configured to determine the second mutual information metric based on a noise and interference covariance matrix of the interfered data resource elements subject to an antenna port and a CRS shift configuration.

In Example 28, the subject matter of any one of Examples 26-27 can optionally include that the baseband circuit is configured to determine the effective mutual information based on a weighted sum of the first mutual information metric and the second mutual information metric.

In Example 29, the subject matter of any one of Examples 26-28 can optionally include that the transmitter circuit further comprises: a digital-to-analog converter configured to convert the baseband signal carrying the effective mutual information to an analog baseband signal; and a modulator configured to modulate the analog baseband signal to the radio frequency carrier.

Example 30 is a method, comprising: means for receiving at a receiver circuit a composite signal comprising non-interfered data resource elements and interfered data resource elements from a plurality of radio cells; means for determining a first mutual information metric based on the non-interfered data resource elements; means for determining a second mutual information metric based on the interfered data resource elements; and means for determining effective mutual information based on a combination of the first mutual information metric and the second mutual information metric.

In Example 31, the subject matter of Example 30 can optionally include that the means for determining the second mutual information metric is configured to determine the second mutual information metric with respect to cell-specific information received from the plurality of radio cells comprised in the data resource elements of the composite signal.

In Example 32, the subject matter of Example 31 can optionally include that the means for determining the second mutual information metric is configured to determine the second mutual information metric with respect to an antenna port and a reference signal shift comprised in the cell-specific information.

In Example 33, the subject matter of any one of Examples 30-32 can optionally include means for weighting the first mutual information metric with respect to a number of the non-interfered data resource elements; and means for weighting the second mutual information metric with respect to a number of the interfered data resource elements.

In Example 34, the subject matter of any one of Examples 30-33 can optionally include means for puncturing the second mutual information metric.

In Example 35, the subject matter of any one of Examples 33-34 can optionally include that the means for determining effective mutual information is configured to determining the effective mutual information based on a sum of the weighted first mutual information metric and the weighted second mutual information metric.

Example 36 is a mobile communications system, comprising: a base station configured to transmit an OFDM signal comprising data resource elements; and a mobile device configured to receive a composite signal comprising non-interfered data resource elements and interfered data resource elements from the base station and a plurality of interfering radio cells, wherein the mobile device comprises a processing circuit configured to determine a first mutual information metric based on the non-interfered data resource elements, a second mutual information metric based on the interfered data resource elements and effective mutual information based on a combination of the first mutual information metric and the second mutual information metric.

In Example 37, the subject matter of Example 36 can optionally include that the processing circuit is configured to determine channel estimates based on a noise and interference covariance measure.

In Example 38, the subject matter of any one of Examples 36-37 can optionally include that the processing circuit is configured to determine the channel estimates based on a Cholesky decomposition of the noise and interference covariance measure.

In Example 39, the subject matter of any one of Examples 36-38 can optionally include that the processing circuit is configured to determine the channel estimates based on a power offset between the interfered data resource elements and a cell-specific reference signal received from the base station.

In Example 40, the subject matter of any one of Examples 36-39 can optionally include that the processing circuit is configured to determine a signal-to-interference-and-noise ratio based on the channel estimates for a particular subcarrier of a plurality of subcarriers.

In Example 41, the subject matter of any one of Examples 36-40 can optionally include that the mobile device is configured to feedback channel state information based on the effective mutual information to the base station.

Example 42 is a circuit, comprising: means for receiving a composite signal at a receiver circuit; means for determining a first mutual information metric based on a first covariance measure; means for determining a second mutual information metric based on a second covariance measure different from the first covariance measure; and means for determining effective mutual information based on a combination of the first mutual information metric and the second mutual information metric.

In Example 43, the subject matter of Example 42 can optionally include that the composite signal comprises non-interfered data resource elements and interfered data resource elements received from a plurality of radio cells, wherein determining the first mutual information metric is based on the non-interfered data resource elements, and wherein determining the second mutual information metric is based on the interfered data resource elements.

In Example 44, the subject matter of any one of Examples 42-43 can optionally include means for puncturing the second mutual information metric.

In Example 45, the subject matter of Example 44 can optionally include that the means for puncturing the second mutual information metric is configured to mark the interfered data resource elements as erasures based on a comparison between a received signal strength indicator of the non-interfered data resource elements and a received signal strength indicator of the interfered data resource elements.

Example 46 is a computer readable medium on which computer instructions are stored which when executed by a computer, cause the computer to perform the method of one of Examples 1 to 19, 24 to 25 and 30 to 35.

In Example 47, the subject matter of Example 25 can optionally include determining an interference of the interfered data resource elements based on a noise covariance estimate of the non-interfered data resource elements, based on a Received Signal Strength Indicator of the interfered data resource elements and based on a Received Signal Strength Indicator of the non-interfered data resource elements.

In Example 48, the subject matter of Example 47 can optionally include computing Channel State Information feedback and demodulating the composite signal based on the determined interference of the interfered data resource elements.

In Example 49, the subject matter of any one of Examples 25, 47 and 48 can optionally include canceling an interference of the interfered data resource elements and determining a residual interference of the interfered data resource elements after the interference canceling.

In Example 50, the subject matter of Example 49 can optionally include computing Channel State Information feedback and demodulating the composite signal based on the residual interference.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the concept of the present disclosure. This application is intended to cover any adaptations or variations of the specific aspects discussed herein.

The invention claimed is:

1. A method, comprising:
 receiving at a receiver circuit a composite signal comprising non-interfered data resource elements and interfered data resource elements from a plurality of radio cells;
 determining a first mutual information metric based on the non-interfered data resource elements;
 determining a second mutual information metric based on the interfered data resource elements; and
 determining effective mutual information based on a combination of the first mutual information metric and the second mutual information metric;
 determining for each precoder in a baseband circuit associated with the receiver circuit, and each rank, a maximum weighted mutual information based on the effective mutual information subject to a maximum criterion with respect to modulation types.

2. The method of claim 1, comprising:
 determining a noise and interference covariance measure of the composite signal based on a plurality of antenna ports and a plurality of cell-specific reference signals; wherein determining the noise and covariance measure of the composite signal is based on at least one shifted cell-specific reference signal;
 filtering a noise and interference covariance measure to generate a filtered noise and interference covariance measure; and
 determining a plurality of channel estimates based on the filtered noise and interference covariance measure of the composite signal.

3. The method of claim 2, comprising:
 determining the channel estimates based on:
 a cell-specific reference signal of undisturbed resource elements;
 a first shifted cell-specific reference signal of disturbed resource elements; and
 a second shifted cell-specific reference signal of disturbed resource elements;
 wherein the second shifted cell-specific reference signal of disturbed resource elements is different than the first shifted cell-specific reference signal of disturbed resource elements.

4. The method of claim 2, comprising:
 determining the channel estimates based on a power offset between the interfered data resource elements of the composite signal and a cell-specific reference signal received from a target radio cell comprised in the composite signal.

5. The method of claim 2, comprising:
 determining a signal-to-interference-and-noise ratio based on the channel estimates for a particular subcarrier of a plurality of subcarriers and based on at least one of a modulation type, a precoder, and a rank.

6. The method of claim 1, wherein determining the second mutual information metric is based on a function of a signal-to-interference-and-noise ratio, wherein the function depends on a modulation type.

7. The method of claim 1, further comprising:
 weighting the first mutual information metric with respect to a number of the non-interfered data resource elements; and
 weighting the second mutual information metric with respect to a number of the interfered data resource elements.

8. The method of claim 7, further comprising:
 puncturing the second mutual information metric by using a weighting of zero.

9. The method of claim 7, further comprising:
 determining the effective mutual information based on a sum of the weighted first mutual information metric and the weighted second mutual information metric.

10. The method of claim 1, further comprising:
 determining for each rank an optimal precoder and corresponding effective mutual information based on a maximum criterion with respect to a sum of the maximum weighted mutual information over the precoders.

11. The method of claim 10, further comprising:
 mapping the effective mutual information of the optimal precoders for each rank to a channel quality indicator table; and
 determining a rank identifier configured to identify a rank optimizing a user equipment throughput.

12. A receiver circuit, comprising:
 a first unit configured to receive a composite signal comprising non-interfered data resource elements and interfered data resource elements from a plurality of radio cells;

a second unit configured to determine a first mutual information metric based on the non-interfered data resource elements;
a third unit configured to determine a second mutual information metric based on the interfered data resource elements; and
a fourth unit configured to determine effective mutual information based on a combination of the first mutual information metric and the second mutual information metric;
wherein the third unit is configured to determine the second mutual information metric based on a noise and interference covariance matrix of the interfered data resource elements subject to an antenna port and a cell-specific reference signal shift configuration; and
a baseband circuit associated with the receiver circuit, to determine for each precoder and each rank, a maximum weighted mutual information based on the effective mutual information subject to a maximum criterion with respect to modulation types.

13. The receiver circuit of claim 12,
wherein the third unit is configured to determine channel estimates based on a noise and interference covariance measure.

14. The receiver circuit of claim 13,
wherein the third unit is configured to determine the second mutual information metric based on the channel estimates.

15. A mobile device, comprising:
a receiver circuit configured to receive a composite signal comprising non-interfered data resource elements and interfered data resource elements from a plurality of radio cells;
a baseband circuit configured to determine a first mutual information metric based on the non-interfered data resource elements, a second mutual information metric based on the interfered data resource elements and effective mutual information based on a combination of the first mutual information metric and the second mutual information metric;
a transmitter circuit configured to modulate a baseband signal comprising the effective mutual information on a radio frequency carrier and to transmit the modulated baseband signal through an air link to a base station;
wherein the baseband circuit is configured to determine the second mutual information metric based on a noise and interference covariance matrix of the interfered data resource elements subject to an antenna port and a cell-specific reference signal shift configuration;
wherein the baseband circuit determines for each precoder and each rank, a maximum weighted mutual information based on the effective mutual information subject to a maximum criterion with respect to modulation type.

16. The mobile device of claim 15,
wherein the baseband circuit is configured to determine the effective mutual information based on a weighted sum of the first mutual information metric and the second mutual information metric.

17. The mobile device of claim 15,
wherein the baseband circuit is configured to determine the second mutual information metric with respect to cell-specific information received from the plurality of radio cells comprised in the data resource elements of the composite signal.

18. The mobile device of claim 17,
wherein the baseband circuit is configured to determine the second mutual information metric with respect to an antenna port and a reference signal shift comprised in the cell-specific information.

* * * * *